United States Patent [19]
Suzuki et al.

[11] Patent Number: 5,544,000
[45] Date of Patent: Aug. 6, 1996

[54] ELECTRIC CONTROL APPARATUS

[75] Inventors: Haruhiko Suzuki, Anjo; Yasunari Kato, Toyoake; Kazuomi Ota; Hiroaki Yamaguchi, both of Anjo, all of Japan

[73] Assignee: Nippondenso Co., Ltd., Kariya, Japan

[21] Appl. No.: 384,796

[22] Filed: Feb. 6, 1995

Related U.S. Application Data

[63] Continuation of Ser. No. 64,974, May 21, 1993, abandoned.

[30] Foreign Application Priority Data

May 22, 1992 [JP] Japan .................................. 4-131156
Apr. 15, 1993 [JP] Japan .................................. 5-088743

[51] Int. Cl.⁶ .............................. G01B 7/14; H03K 17/90
[52] U.S. Cl. ................. 361/139; 324/207.2; 324/207.21
[58] Field of Search ........................ 324/207.2, 207.21, 324/207.25; 361/139, 143, 146, 149, 150, 267; 123/490; 307/101

[56] References Cited

U.S. PATENT DOCUMENTS

| | | | |
|---|---|---|---|
| 3,551,776 | 12/1970 | Tawfik et al. ............................ | 318/564 |
| 4,369,405 | 1/1983 | Sato et al. ............................ | 324/207.14 |
| 4,392,375 | 7/1983 | Eguchi et al. ........................ | 324/207.21 |
| 4,703,261 | 10/1987 | Berchtold ............................ | 324/207.2 |
| 4,737,710 | 4/1988 | Van Antwerp et al. ................ | 324/208 |
| 4,810,967 | 3/1989 | Yokoyama et al. ................... | 324/207.21 |
| 4,989,451 | 2/1991 | Ogawa et al. ........................ | 324/207.2 |
| 5,055,781 | 10/1991 | Sakakibara et al. ................. | 324/207.21 |

FOREIGN PATENT DOCUMENTS

| | | |
|---|---|---|
| 0283291 | 9/1988 | European Pat. Off. . |
| 0412200 | 2/1991 | European Pat. Off. . |
| 63-115713 | 7/1988 | Japan . |
| 1-148808 | 10/1988 | Japan . |
| 64-37607 | 2/1989 | Japan . |
| 1-119701 | 5/1989 | Japan . |
| 1-148807 | 10/1989 | Japan . |
| 2130403 | 5/1990 | Japan . |
| 2122205 | 5/1990 | Japan . |
| 2298815 | 12/1990 | Japan . |
| 2135782 | 9/1984 | United Kingdom . |
| 2165966 | 4/1986 | United Kingdom . |
| 2176616 | 12/1986 | United Kingdom . |
| 2242037 | 9/1991 | United Kingdom . |

OTHER PUBLICATIONS

Journal of Nippondenso Technical Disclosure; Jul. 20, 1979 (w/whole English translation).

Primary Examiner—William M. Shoop, Jr.
Assistant Examiner—Peter Ganjoo
Attorney, Agent, or Firm—Cushman, Darby & Cushman

[57] ABSTRACT

An electric control apparatus includes a magnetic flux generating device for generating a magnetic flux. A first magnetic-to-electric transducer element detects a magnitude of the magnetic flux which is responsive to a motion of a movable body. A second magnetic-to-electric transducer element detects the magnitude of the magnetic flux which is responsive to the motion of the movable body. A control signal outputting device compares a detection signal output from the first magnetic-to-electric transducer element and a detection signal output from the second magnetic-to-electric transducer element with each other. The control signal outputting device is operative to output a control signal based on a result of the comparison between the detection signals.

44 Claims, 14 Drawing Sheets

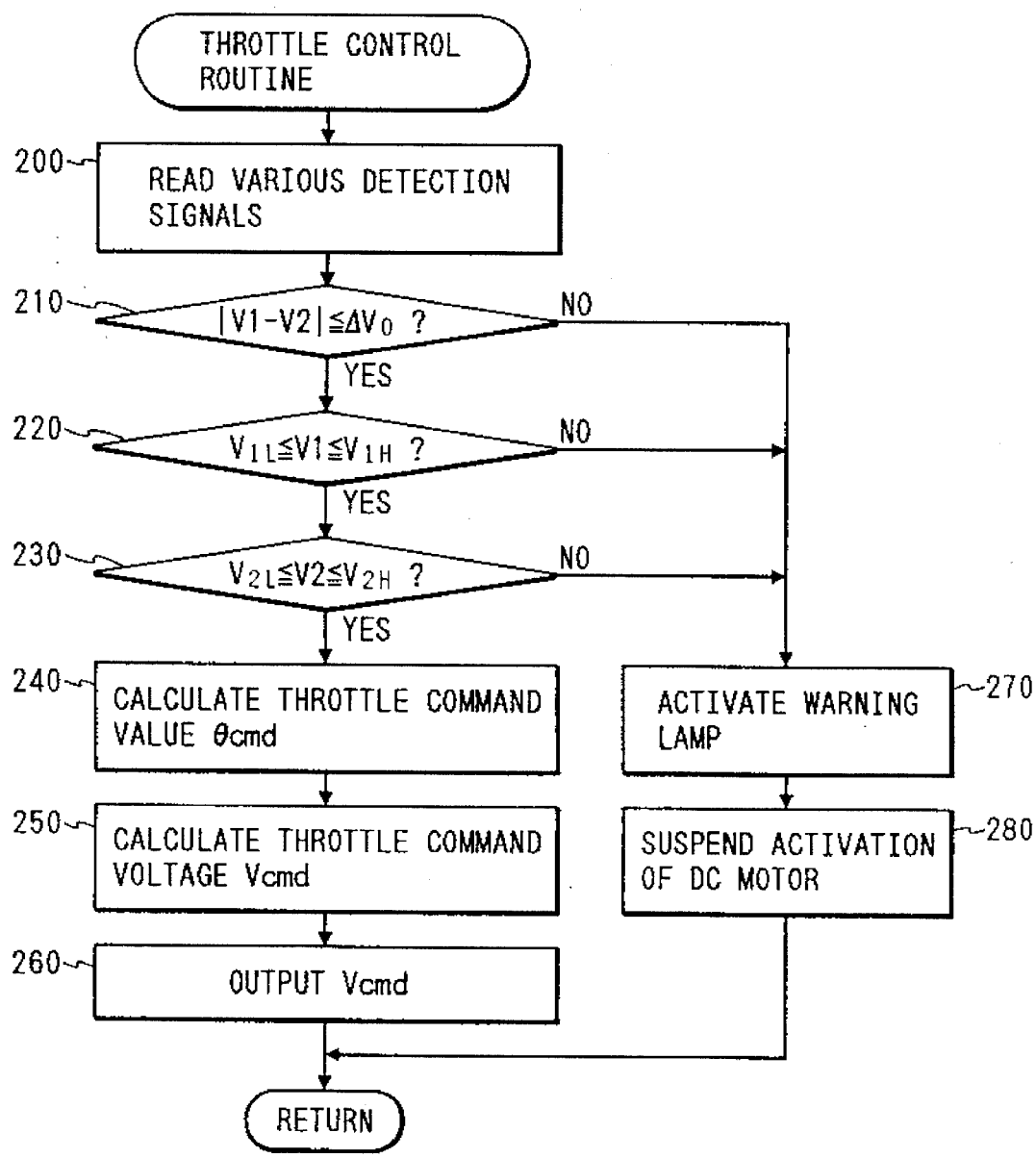

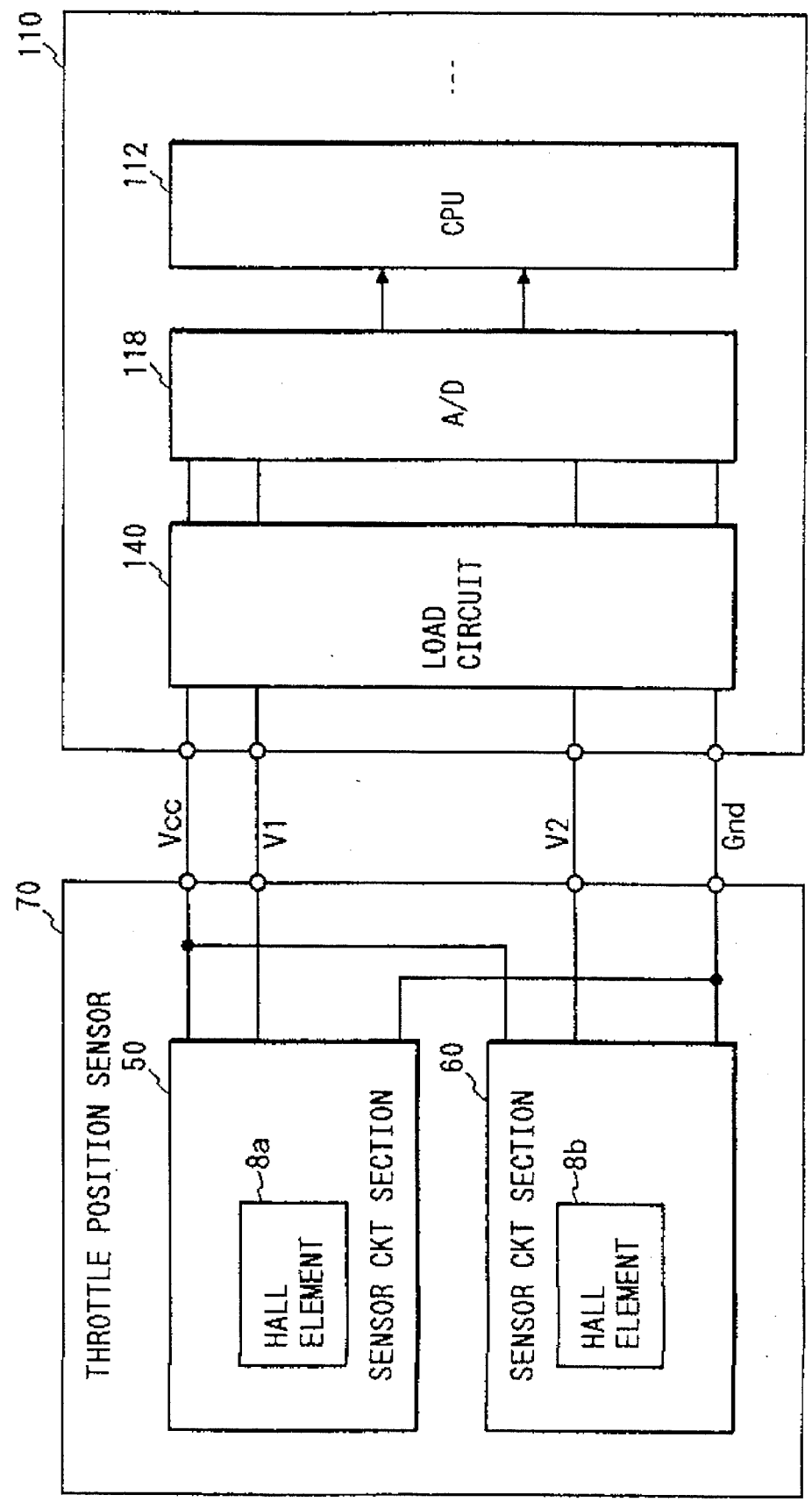

ELECTRIC CONTROL APPARATUS

This is a continuation of application Ser. No. 08/064,974, filed on May 21, 1993, which was abandoned upon the filing hereof.

BACKGROUND OF THE INVENTION

1. Field of the Invention

This invention relates to an electric control apparatus and more specifically to an electric control apparatus using a magnetic-field source and a magnetic-to-electric transducer which can be applied to various devices such as a throttle position sensor.

2. Description of the Prior Art

In some automotive vehicles, the position of a throttle valve is detected by a throttle position sensor, and a vehicle-driving engine is controlled in response to the detected position of the throttle valve.

Japanese published unexamined patent application 2-298815 discloses a rotational angle sensor used as a throttle position sensor of a noncontact type. In the throttle position sensor of Japanese patent application 2-298815, a magnetoresistive element is formed on a base of a magnetic sensor, and a magnet is provided at the fore end of a shaft gearing with a throttle valve. The magnet is disposed at a position opposing or facing the magnetoresistive element. A magnetic field of a uniform flux density is developed between an N pole and an S pole on arms of arms the magnet. The magnetoresistive element is exposed to a portion of the magnetic field. As the shaft gearing with the throttle valve rotates with the rotation of the throttle valve, the magnetic field rotates and hence the resistance of the magnetoresistive element varies. The resistance of the magnetoresistive element so detected indicated of the angular position of the throttle valve.

In cases where the output signal of such a throttle position sensor is used for engine control, it is desirable to detect a malfunction of the sensor and to provide a countermeasure against the detected malfunction to attain a fail-safe function. Japanese patent application 2-298815 does not teach the detection of a malfunction of the throttle position sensor.

Japanese published unexamined patent application 64-37607 discloses a throttle position sensor having a storage space within a throttle body. A connector is fitted to the storage space. A magnetic sensitive element fixed on the connector opposes a permanent magnet. The magnetic sensitive element has a pattern face which is approximately parallel to a magnetic field generated by the permanent magnet. The permanent magnet rotates together with the throttle valve. The magnetic field detected by the magnetic sensitive element varies in accordance with rotation of the throttle valve. Thus, the detection of the magnetic field provides an indication of the angular position of the throttle valve. Japanese patent application 2-298815 does not teach the detection of a malfunction of the throttle position sensor.

SUMMARY OF THE INVENTION

It is an object of this invention to provide an electric control apparatus.

A first aspect of this invention provides an electric control apparatus comprising magnetic flux generating means for generating a magnetic flux; a movable body; a first magnetic-to-electric transducer element for detecting a magnitude of the magnetic flux which is responsive to a motion of the movable body; a second magnetic-to-electric transducer element for detecting the magnitude of the magnetic flux which is responsive to the motion of the movable body; and control signal outputting means for comparing a detection signal outputted from the first magnetic-to-electric transducer element and a detection signal outputted from the second magnetic-to-electric transducer element with each other, and for outputting a signal necessary for control on the basis of a result of said comparing.

A second aspect of this invention provides an electric control apparatus comprising magnetic flux generating means for generating a magnetic flux; a movable body; a first magnetic-to-electric transducer element for detecting a magnitude of the magnetic flux which is responsive to a motion of the movable body; a second magnetic-to-electric transducer located at such a position as to detect a magnitude of the magnetic flux which is equal to the magnetic flux magnitude detected by the first magnetic-to-electric transducer element; and control signal outputting means for mutually processing a detection signal outputted from the first magnetic-to-electric transducer element and a detection signal outputted from the second magnetic-to-electric transducer element, and for outputting a signal necessary for control on the basis of a result of said processing.

A third aspect of this invention provides an apparatus comprising a movable throttle valve; a throttle position sensor assembly which comprises means for generating a magnetic field; a first magnetic sensor exposed to a portion of the magnetic field, and sensing said portion of the magnetic field and generating a first detection signal representative thereof; a second magnetic sensor exposed to a portion of the magnetic field, and sensing said portion of the magnetic field and generating a second detection signal representative thereof; means for varying the portions of the magnetic field, to which the first and second magnetic sensor are exposed respectively, in response to a movement of the throttle valve; and means for comparing the first and second detection signals with each other, and detecting whether the throttle position sensor assembly is good or wrong in response to a result of said comparing.

BRIEF DESCRIPTION OF THE DRAWINGS

FIG. 22 is a flowchart of a throttle control routine of a program controlling a CPU in the apparatus of FIG. 21;

FIG. 23 is a block diagram of am apparatus according to a fifth embodiment of this invention.

DESCRIPTION OF THE PRESENTLY PREFERRED EMBODIMENTS

Figure 1:
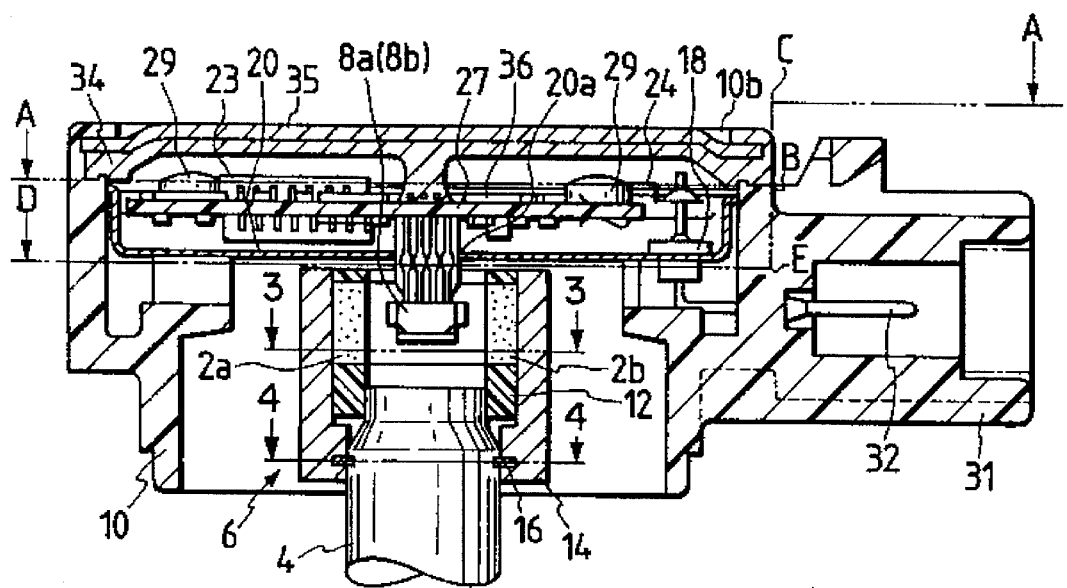
FIG. 1 is a sectional view of a throttle position sensor according to a first embodiment of this invention.
Figure 3:
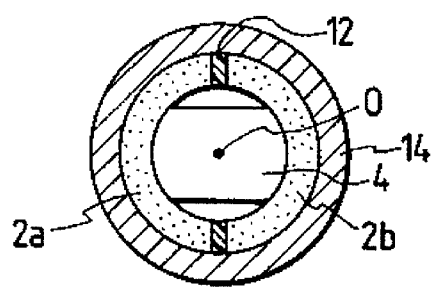
FIG. 3 is a sectional view of the casing taken along the lines 3—3 of FIG. 1.
Figure 2:
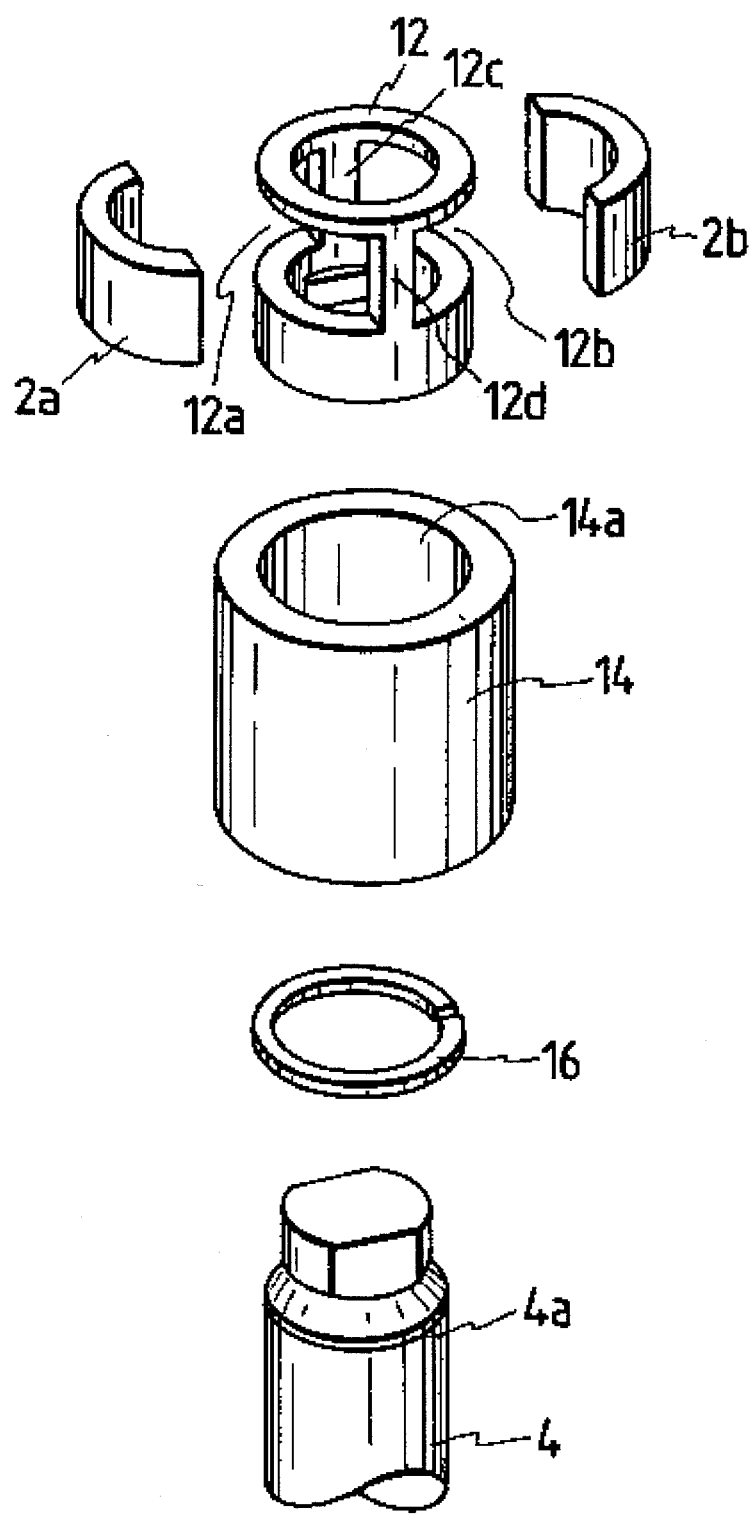
FIG. 2 is an exploded view of a casing in the throttle position sensor of FIG. 1.

With reference to FIGS. 1 and 2, a throttle position sensor includes a pair of semicylindrical permanent magnets 2a and 2b made of rare-earth material such as Nd-Fe-B based material. As shown in FIGS. 2 and 3, the magnets 2a and 2b are opposed to each other to form a cylindrical-configuration magnet. The throttle position sensor also includes a casing 6 which serves as a first fixing member for mounting the cylindrical magnet on an end of a rotatable shaft 4 of a throttle valve. In addition, the throttle position sensor includes a housing 10 made of synthetic resin which serves as a second fixing member. Specifically, the housing 10 has an inner space. Two Hall elements 8a and 8b are retained at a central region in the inner space of the housing 10.

Figure 4:
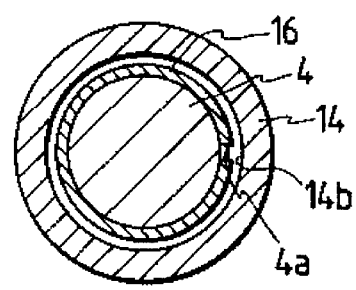
FIG. 4 is a sectional view of the casing taken along the lines 4—4 of FIG. 1.

As best shown in FIG. 2, the casing 6 includes a retainer 12, a rotor 14, and a cisclip 16. The retainer 12 is made of resin. The retainer 12 is of a cylindrical shape having a diameter approximately equal to a diameter of the cylindrical configuration of the magnets 2a and 2b. The retainer 12 has openings 12a and 12b for accommodating the magnets 2a and 2b. The rotor 14 is made of iron. The rotor 14 has a cylindrical shell with an axial hole 14a for accommodating the retainer 12. As best shown in FIG. 4, the inner surfaces of a lower part of the rotor 14 have a circumferential groove 14b into which the cisclip 16 can be fitted. The shaft 4 of the throttle valve has a circumferential groove 4a into which the cisclip 16 can be fitted.

The shaft 4 of the throttle valve has a larger-diameter portion, a smaller-diameter portion, and a tapered portion extending between the larger-diameter portion and the smaller-diameter portion. The smaller-diameter portion forms an end of the shaft 4. The circumferential groove 4a is located at the larger-diameter portion of the shaft 4. The end of the shaft 4 has two opposite arcuate sides and two parallel flat sides.

The retainer 12 has a lower opening which conforms to the end of the shaft 4 of the throttle valve. The lower opening of the retainer 12 can snugly accommodate the end of the shaft 4, During assembly of the throttle position sensor, the magnets 2a and 2b are fitted into the openings 12a and 12b of the retainer 12. Then, the retainer 12 with the magnets 2a and 2b is forced into the rotor 14. An upper portion of the rotor 14 is pressed inward to prevent the retainer 12 from moving out of the rotor 14, Subsequently, an outer edge of the cisclip 16 is fitted into the groove 14b in the inner surfaces of the rotor 14. The rotor 14 with the retainer 12 is forced onto the shaft 4 of the throttle valve while the end of the shaft 4 is fitted into the lower opening of the retainer 12. An inner edge of the cisclip 16 is fitted into the groove 4a of the shaft 4. As a result, the magnets 2a and 2b are concentrically fixed to the end of the shaft 4 of the throttle valve (see FIG. 3). In FIG. 3, "O" denotes the central axis of the shaft 4.

As best shown in FIG. 2, the retainer 12 has a pair of diametrically-opposed ribs 12c and 12d which axially extend between the openings 12a and 12b. The ribs 12c and 12d have a predetermined circumferential dimension. The ribs 12c and 12d serve as spacers by which adjacent ends of the magnets 2a and 2b are spaced from each other in the circumferential direction as shown FIG. 3.

The housing 10 is attached to a throttle body. The housing 10 is designed so that the Hall elements 8a and 8b can be located at a central area with respect to the cylindrical configuration of the magnets 2a and 2b. As will be described later, the housing 10 accommodates an electrical circuit for processing output signals of the Hall elements 8a and 8b which represent the angular position or the rotational angle of the shaft 4 of the throttle valve.

The interior of the housing 10 will be further described with reference to FIGS. 1, 5, 6, and 7. The housing 10 accommodates an inner casing 20 made of nonmagnetic electrically-conductive material. Four feed-through capacitors 18 are electrically connected and mechanically fixed to the inner casing 20 by solder or the like. The inner casing 20 has a central opening 20a which allows the Hall elements 8a and 8b to be located downward of the inner casing 20. Outer edges of the inner casing 20 have apertures for attachment of the casing 20 to the housing 10. The Hall elements 8a and 8b, signal processing circuit parts 23, and four terminals 24 are provided on a printed circuit board 27 accommodated in the inner casing 20. The Hall elements 8a and 8b are fixedly disposed within a holder 25 which is mounted on the printed circuit board 27. The inner casing 20 and the printed circuit board 27 are fixed to the housing 10 by screws 29.

Figure 7:
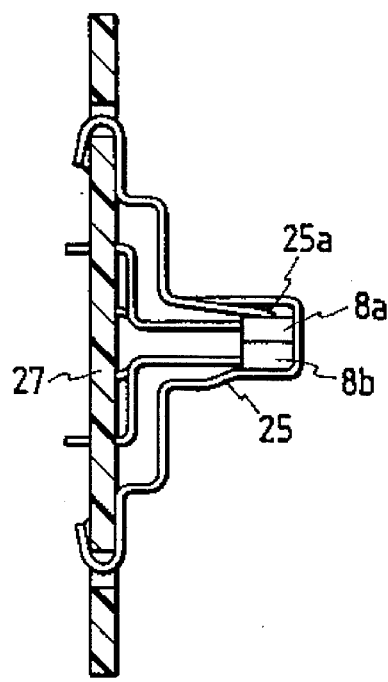
FIG. 7 is a sectional view of the throttle position sensor taken along the lines 7—7 of FIG. 5.

The holder 25 supports the Hall elements 8a and 8b on the printed circuit board 27. During attachment of the housing 10 to the throttle body, the holder 25 serves to align the center of the assembly of the Hall elements 8a and 8b with the center of the cylindrical configuration of the magnets 2a and 2b. As shown in FIG. 7, the holder 25 has a latch 25a which presses the Hall elements 8a and 8b against a side wall of the holder 25. Thus, the Hall elements 8a and 8b are fixed and located within the holder 25.

The housing 10 has a connector portion 31 for providing electrical connection of the throttle position sensor with an external device. The connector portion 31 has four connector terminals 32 electrically connected to the terminals 24 on the printed circuit board 27 via the feed-through capacitors 18 respectively, The connector terminals 32 allow power feed from an external power supply to the circuit parts 23 on the printed circuit board 27. In addition, the connector terminals 32 allow transmission of output signals of the throttle position sensor to an external device.

Figure 5:
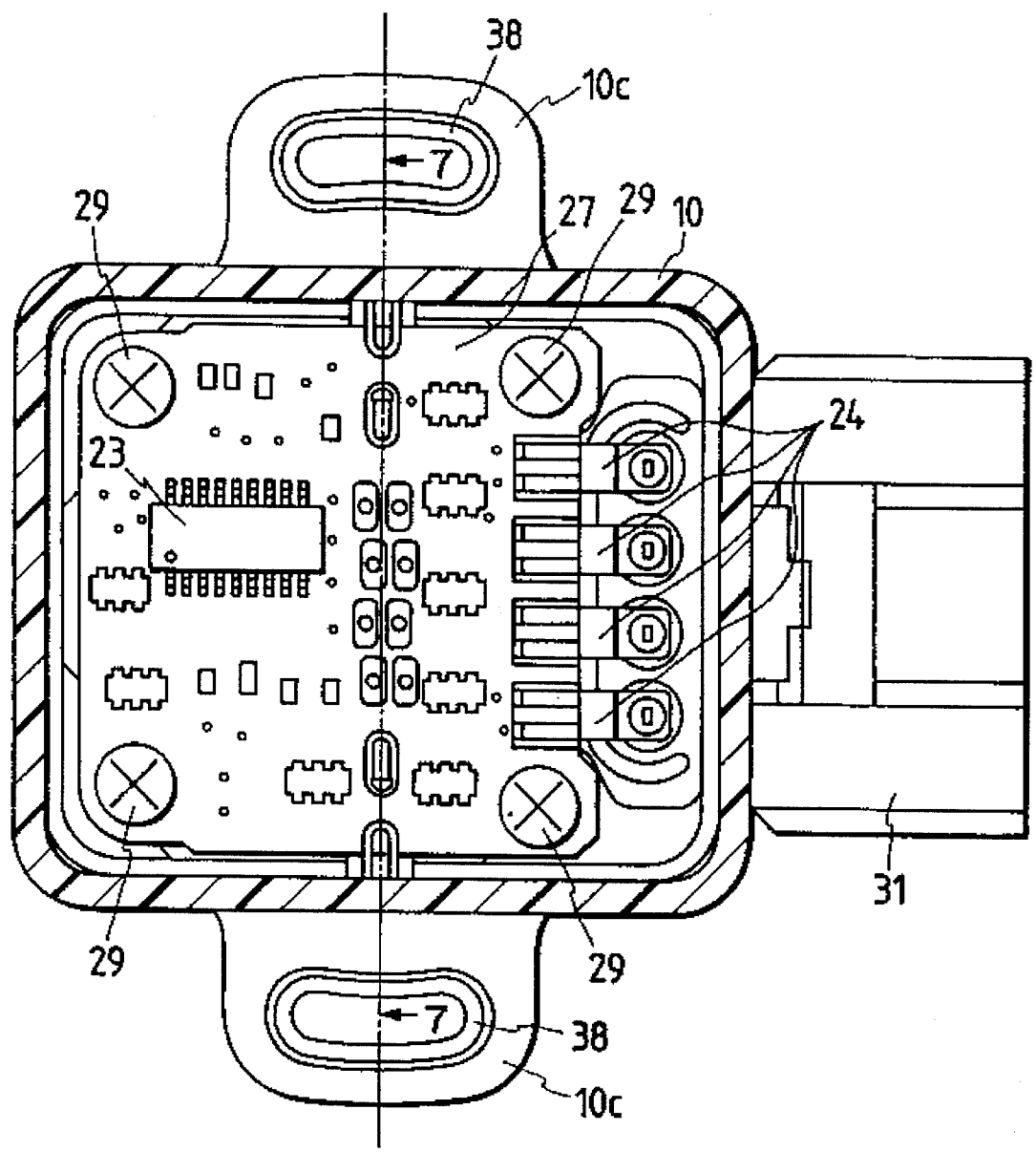
FIG. 5 is a sectional view of the throttle position sensor taken along the lines A-B-C-A of FIG. 1.
Figure 6:
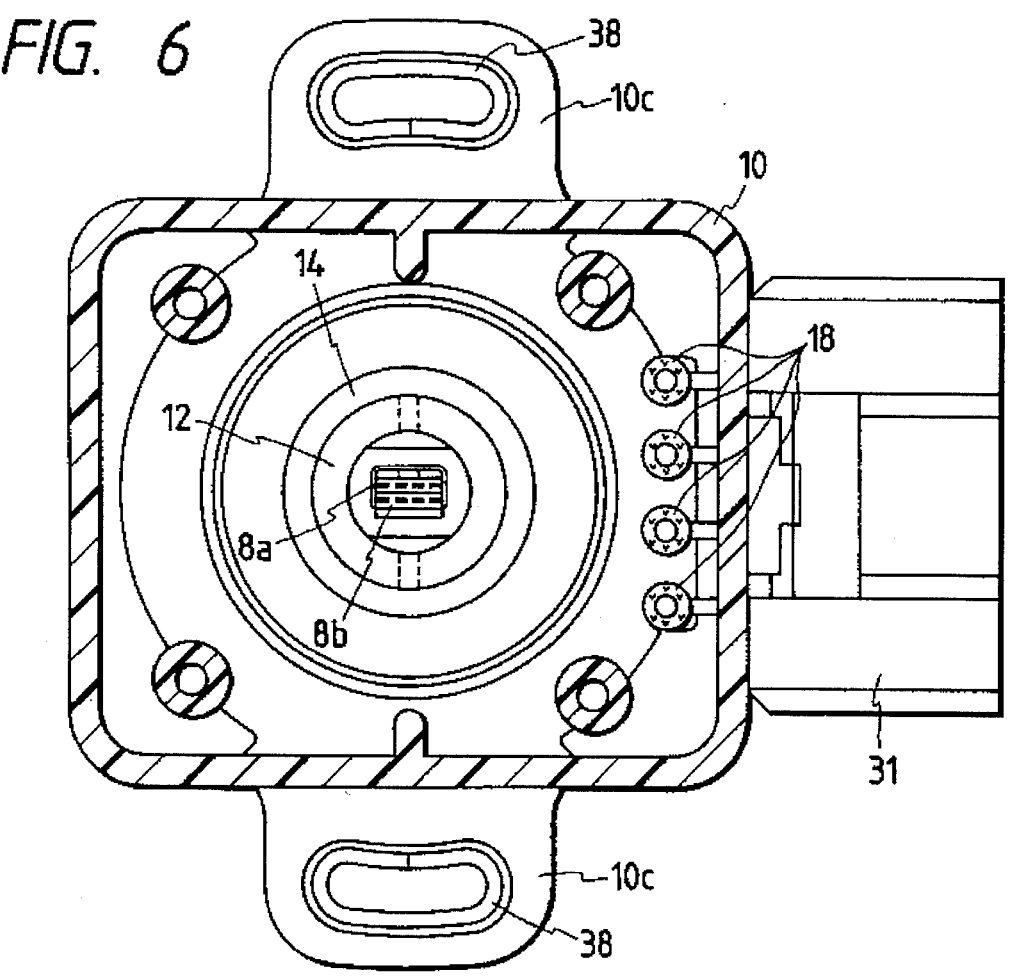
FIG. 6 is a sectional view of the throttle position sensor taken along the lines D-E-C-A of FIG. 1.

The housing 10 has an upper opening 10b into which a rubber packing 34 is fitted. The packing 34 extends above the printed circuit board 27. A cover 35 made of magnetic material is located above the packing 34. Edges of the packing 34 and the cover 35 are placed on a step in the walls of the housing 10. Upper edges of the housing 10 are heated and pressed so that the packing 34 and the cover 35 will be fixedly held between the upper edges of the housing 10 and the step on the housing 10. The packing 34 and the tuner casing 20 define a sealed interior containing the printed circuit board 27. Vapor proofing a material such as humi-seal is placed on or applied to the printed circuit board 27 to prevent the sealed interior from being humid. As shown in FIGS. 5 and 6, the housing 10 is formed with a pair of connecting portions 10c in which bushing 38 are embedded. The connecting portions 10c are attached to the throttle body so that the housing 10 will be fixed thereto.

During assembly of the throttle position sensor, as previously described, the magnets 2a and 2b are fixed to the end of the shaft 4 of the throttle valve by using the casing 6. Then, the housing 10 is placed around the casing 6. The housing 10 is attached to the throttle body. As a result, the Hall elements 8a and 8b are located within the circular space defined in the circular configuration of the magnets 2a and 2b.

Figure 8:
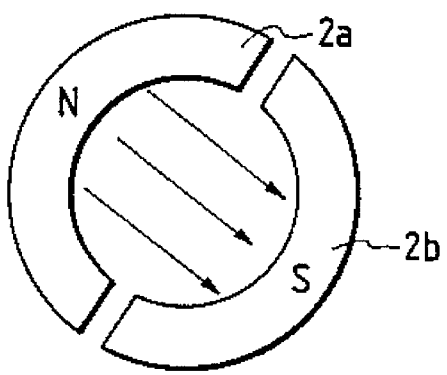
FIG. 8 is a plan view of magnets used in the throttle position sensor of FIG. 1.

The magnets 2a and 2b are designed so that, as shown in FIG. 8, an N pole and an S pole will be formed on the magnets 2a and 2b respectively. Thus, the magnets 2a and 2b generate a magnetic field, in the circular space of the cylindrical configuration of the magnets 2a and 2b, which extends in a direction perpendicular to the axial direction. The Hall elements 8a and 8b are symmetrical with respect to the rotation axis of the rotor 14 (the rotation axis of the shaft 4 of the throttle valve) and are parallel to planes along the rotation axis of the rotor 14 so that the Hall element 8a and 8b can equally sense portions of the magnetic field perpendicular to the rotation axis of the rotor 14.

Figure 9:
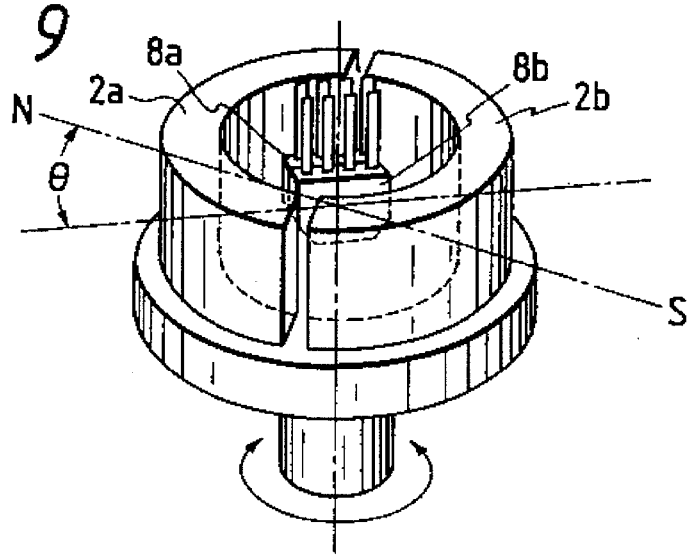
FIG. 9 is a perspective view of the magnets and Hall elements in the throttle position sensor of FIG. 1.
Figure 10:
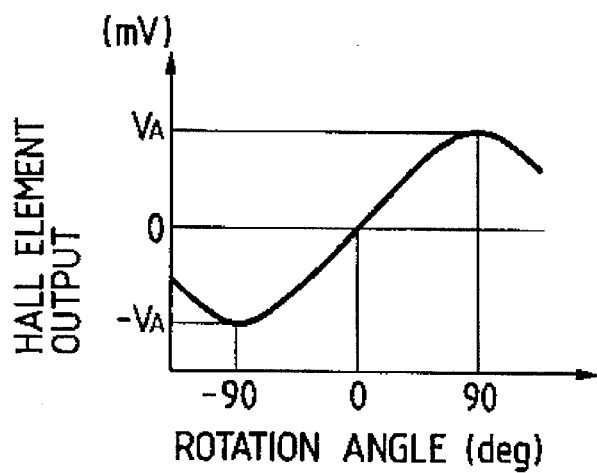
FIG. 10 is a diagram of the relation between an output voltage of a Hall element and a rotational angle of a throttle valve in the throttle position sensor of FIG. 1.

As the shaft 4 of the throttle valve rotates, the magnets 2a and 2b rotate about the assembly of the Hall elements 8a and 8b so that the directions of the portions of the magnetic field with respect to magnetic sensitive planes of the Hall elements 8a and 8b vary (see FIG. 9). The angle of the incidence of the magnetic field portions to the magnetic sensitive planes of the Hall elements 8a and 8b is now denoted by "θ" as shown in FIG. 9. The voltage VH of an output signal of the assembly of the Hall elements 8a and 8b varies with the angle "θ" of the incidence according to the following equation.

$$VH = VA \cdot \sin\theta \quad (1)$$

where VA denotes a predetermined constant. As shown in FIG. 10, the Hall-element output voltage VH varies from −VH to +VH along a sinusoidal curve when the shaft 4 of the throttle valve rotates from an angular position of −90 degrees to an angular position of +90 degrees.

A circuit pattern and the circuit parts 23 on the printed circuit board 27 compose a sensor circuit which serves to operate the Hall elements 8a and 8b and to output signals representing the detected throttle valve position.

Figure 11:
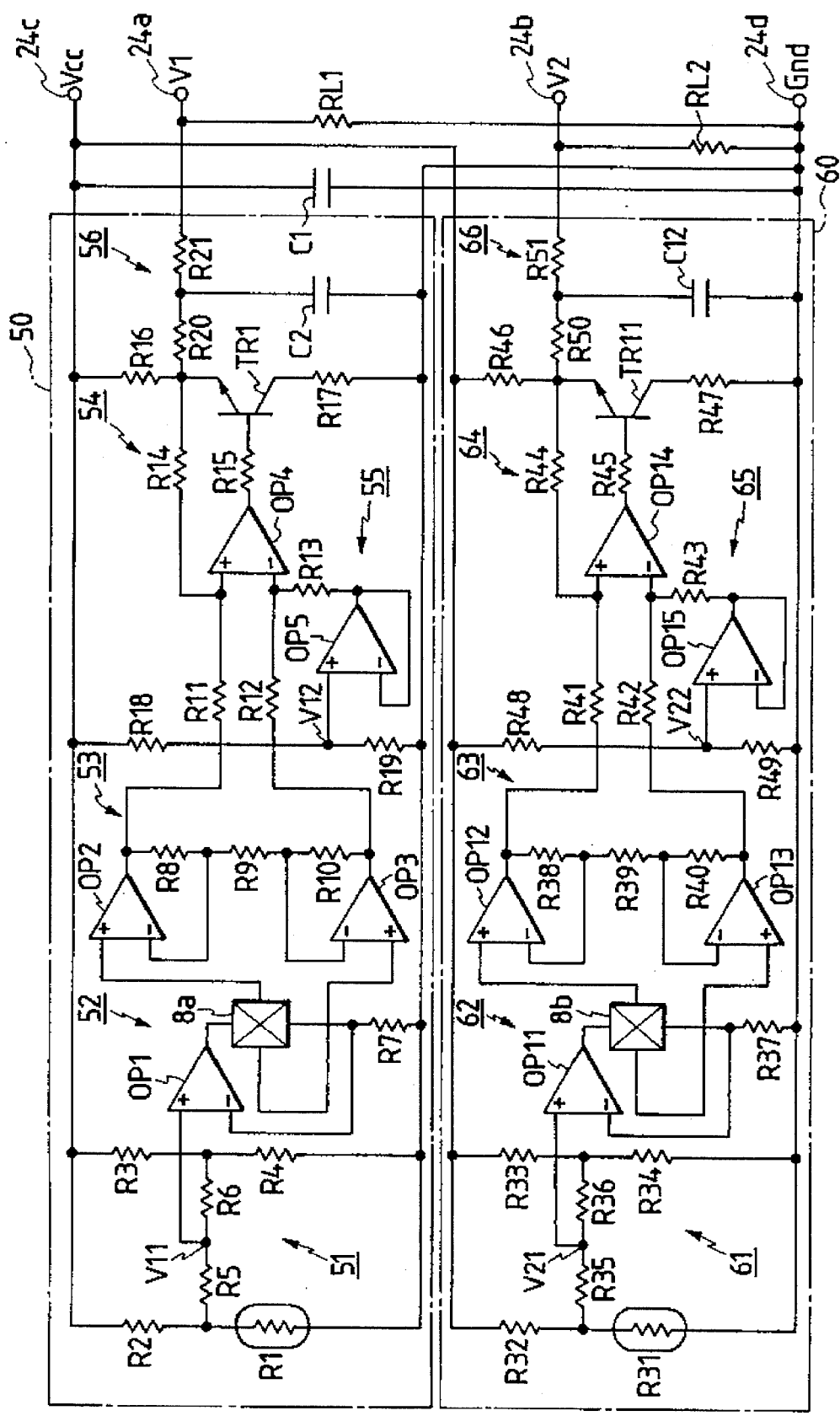
FIG. 11 is a schematic diagram of a sensor circuit in the throttle position sensor of FIG. 1.

As shown in FIG. 11, the sensor circuit has sections 50 and 60 for the Hall elements 8a and 8b respectively. The previously-mentioned terminals 24 on the printed circuit board 27 are now identified by characters 24a, 24b, 24c, and 24d respectively. The terminals 24a and 24b are used for transmitting output signals of the sensor sections 50 and 60 respectively. The terminals 24c and 24d are used as power supply terminals, that is, a positive power supply terminal and a ground terminal respectively.

A positive power supply voltage line (A Vcc line) extending from the terminal 24c is separated, on the printed circuit board 27, into two power supply lines each connected to the circuit sections 50 and 60, respectively. In addition, ground line (a Gnd line) extending from the terminal 24d is separated, on the printed circuit board 27, into two ground lines connected to the circuit sections 50 and 60 respectively. A capacitor C1 connected between the Vcc line and the Gnd line serves to remove noise from the Vcc line.

The circuit section 50 includes a temperature compensation circuit 51, a drive circuit 52, a buffer circuit 53, a differential amplifier circuit 54, a reference voltage generating circuit 55, and a filter circuit 56. The temperature compensation circuit 51 has a network of a temperature sensitive resistor R1 and general fixed resistors R2–R6. The resistor network is connected between the Vcc line and the Gnd line. The temperature sensitive resistor R1 has positive temperature characteristics. The temperature compensation circuit 51 generates a temperature-compensated reference voltage V11. The drive circuit 52 follows the temperature compensation circuit 51. The drive circuit 52 includes an operational amplifier OP1 and a resistor R7. The drive circuit 52 generates a constant current on the basis of the reference voltage V11, and feeds the constant current to the Hall element 8a to drive the latter. The Hall element 8a has output terminals which are followed by the buffer circuit 53 connected to the differential amplifier circuit 54. The buffer circuit 53 includes operational amplifiers OP2 and OP3, and resistors R8–R10. Voltages at the output terminals of the Hall element 8a are transmitted via the buffer circuit 53 to two input terminals of the differential amplifier circuit 54 respectively. The differential amplifier circuit 54 includes an operational amplifier OP4, a transistor TR1, and resistors R11–R17. The differential amplifier circuit 54 outputs a signal representing the difference between the output voltages of the Hall element 8a. The reference voltage generating circuit 55 includes a series combination of resistors R18 and R19 connected between the Vcc line and the Gnd line. The combination of the resistors R18 and R19 derives a reference voltage V12 from the power supply voltage Vcc. The reference voltage generating circuit 55 also includes an operational amplifier OP5 which provides a raised output voltage of the differential amplifier circuit 54 by using the reference voltage V12. The filter circuit 56 is connected between the differential amplifier circuit 54 and the output terminal 24a. The filter circuit 56 includes a network of a capacitor C2 and resistors R20 and R21. A load resistor RL1 is connected between the output terminal 24a and the ground terminal 24d. The output voltage of the differential amplifier circuit 54 is transmitted to the output terminal 24a via the filter circuit 56. The voltage at the output terminal 24a. that is, the voltage across the load resistor RL1, is used as a detection voltage signal V1 representing the degree of opening through the throttle valve or the angular position of the Throttle valve.

The circuit section 60 includes a temperature compensation circuit 61, a drive circuit 62, a buffer circuit 63, a differential amplifier circuit 64, a reference voltage generating circuit 65, and a filter circuit 66. The temperature compensation circuit 61 has a network of a temperature sensitive resistor R31 and general fixed resistors R32–R36. The resistor network is connected between the Vcc line and the Gnd line. The temperature sensitive resistor R31 has positive temperature characteristics. The temperature compensation circuit 16 generates a temperature-compensated reference voltage V21. The drive circuit 62 follows the temperature compensation circuit 61. The drive circuit 62 includes an operational amplifier OP11 and a resistor R37. The drive circuit 62 generates a constant current on the basis of the reference voltage V21, and feeds the constant current to the Hall element 8b to drive the latter. The Hall element 8b has output terminals which are followed by the buffer circuit 63 connected to the differential amplifier circuit 64. The buffer circuit 63 includes operational amplifiers OP12 and OP13, and resistors R38–R40. Voltages at the output terminals of the Hall element 8b are transmitted via the buffer circuit 63 to two input terminals of the differential amplifier circuit 64 respectively. The differential amplifier circuit 64 includes an operational amplifier OP14, a transistor TR11, and resistors R41–R47. The differential amplifier circuit 64 outputs a signal representing the difference between the output voltages of the Hall element 8b. The reference voltage generating circuit 65 includes a series combination of resistors R48 and R49 connected between the Vcc line and the Gnd line. The combination of the resistors R48 and R49 derives a reference voltage V22 from the power supply voltage Vcc. The reference voltage generating circuit 65 also includes an operational amplifier OP15 which provides a raised output voltage of the differential amplifier circuit 64 by using the reference voltage V22. The filter circuit 66 is connected between the differential amplifier circuit 64 and the output terminal 24b. The filter circuit 66 includes a network of a capacitor C12 and resistors R50 and R51. A load resistor RL2 is connected between the output terminal 24b and the ground terminal 24d. The output voltage of the differential amplifier circuit 64 is transmitted to the output terminal 24b via the filter circuit 66. The voltage at the output terminal 24b, that is, the voltage across the load resistor RL2, is used as a detection voltage signal V2 representing the degree of opening through the throttle valve or the angular position of the throttle valve.

Figure 12:
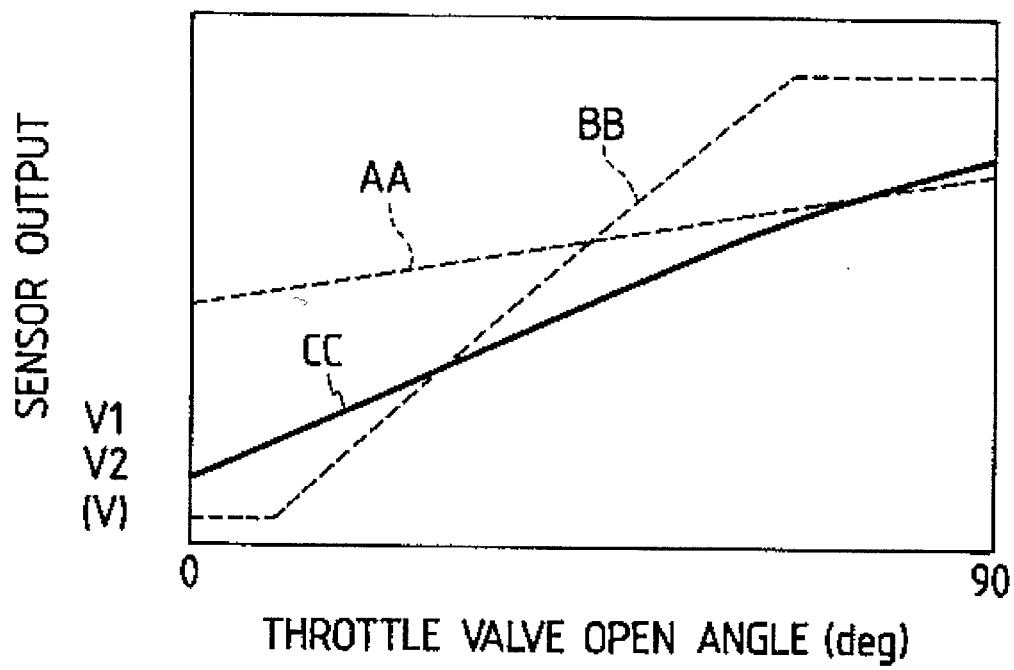
FIG. 12 is a diagram of the relation among the detection output signals of the throttle position sensor of FIG. 1 and the degree of opening of a throttle valve.

As the degree of opening through the throttle valve or the angular position of the throttle valve varies between 0 degree to 90 degrees, the detection voltage signals V1 and V2 change along the solid line CC of FIG. 12. Thus, the angular position of the throttle valve can be derived from the detection voltage signals V1 and V2.

It is preferable that, at a throttle valve angular position of 0 degree, the magnetic sensitive planes of the Hall elements 8a and 8b are offset with respect to the direction of the magnetic field by an angle of −30 degrees. In this case, the detection voltage signals V1 and V2 are given by the following equation.

$$V1, V2 = K \cdot \sin(\theta - 30) + VM \quad (2)$$

where "K" denotes a constant depending on the characteristics of signal amplification by the circuit sections 50 and 60, and VM denotes the reference (offset) voltages V12 and V22 provided by the reference voltage generating circuits 55 and 65. The offset relation of the magnetic sensitive planes of the Hall elements 8a and 8b with the direction of the magnetic field is designed so that an approximately linearly-variable range of the detection voltage signals V1 and V2 will extend over the throttle-valve angular position range of 0 degree to 90 degrees.

As previously described, the casing 6 is used for retaining the magnets 2a and 2b and fixing the magnets 2a and 2b to the shaft 4 of the throttle valve. On the other hand, the housing 10 is used for supporting the Hall elements 8a and 8b and the printed circuit board 27. The casing 6 and the housing 10 are separate members. Thus, during attachment of the throttle position sensor to the throttle valve, it is allowable to separately mount the assembly including the casing 6 and the assembly including the housing 10. Accordingly, attachment of the throttle position sensor to the throttle valve can be easy. In addition, a typical bearing for rotatably supporting the magnets 2a and 2b within the housing 10 is unnecessary, and the structure of the throttle position sensor can be simple.

As previously described, a pair of the semicylindrical magnets 2a and 2b, on which an N pole and an S pole are formed respectively, are used to generate a magnetic field perpendicular to the axis of the shaft 4 of the throttle valve. The magnets 2a and 2b are held at opposite positions by the retainer 12, being fixed to the end of the shaft 4 of the throttle valve. The retainer 12 is designed to provide gaps between the adjacent ends of the magnets 2a and 2b. Thus, if the assembly of the Hall element 8a and 8b is made offcenter from the circular configuration of the magnets 2a and 2b due to a positional unwanted shift between the casing 6 and the housing 10, the detection voltage signals V1 and V2 are prevented from changing significantly so that the accuracy of detection of the throttle valve position is maintained.

Figure 13:
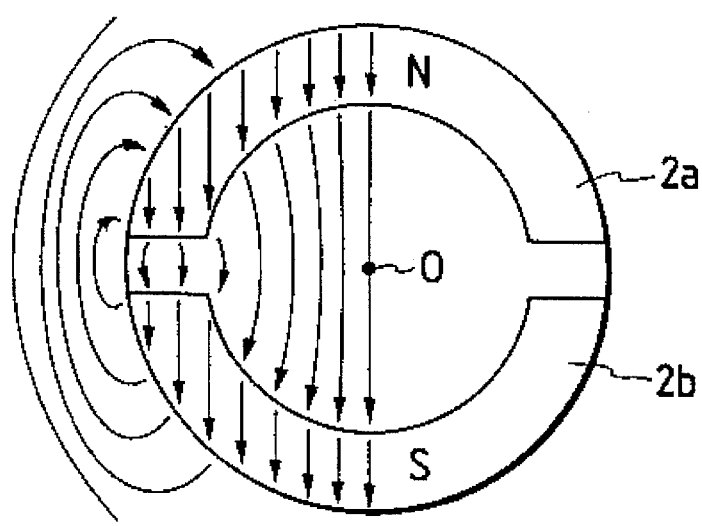
FIG. 13 is a plan view of the magnets and magnetic flux lines in the throttle position sensor of FIG. 1.

As previously described, the semicylindrical magnets 2a and 2b are opposed to each other to form a cylindrical-configuration magnet. In this configuration, as shown in FIG. 13, magnetic lines of flux extend from the semicylindrical magnet 2a to the semicylindrical magnet 2b along inwardly curved directions so that an increased intensity of the magnetic field occurs near the center "O". The increased intensity of the magnetic field near the center "O" of the cylindrical configuration can suppress a detection error caused by unwanted shift of the Hall elements 8a and 8b from correct positions. This advantage was confirmed by the following experiments.

Figure 14:
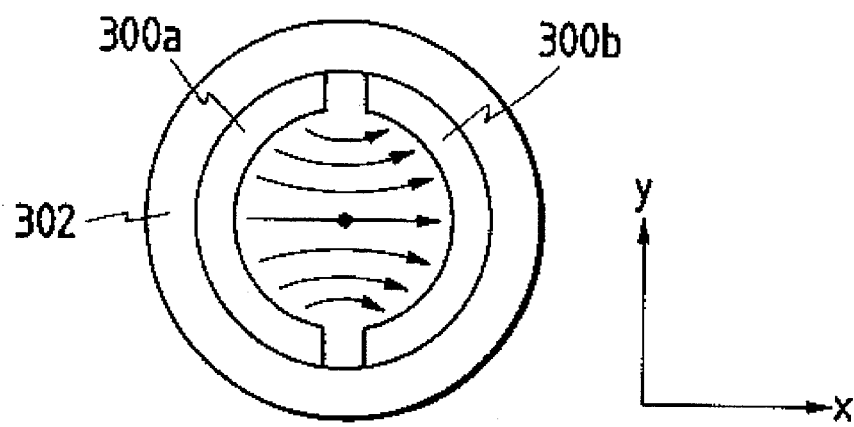
FIG. 14 is a plan view of an assembly of magnets and a rotor which is used during experiments.

During the experiments, as shown in FIG. 14, semicylindrical magnets 300a and 300b, on which an N pole and an S pole were provided respectively, were opposed to each other to form a cylindrical-configuration magnet disposed within a cylindrical iron rotor 302. A diametrical direction passing through the center of the cylindrical magnet and being parallel to the direction of the magnetic field was defined as an "x" direction. A diametrical direction passing through the center of the cylindrical magnet and being perpendicular to the "x" direction was defined as a "y" direction. A Hall element was disposed in the cylindrical configuration of the magnets 300a and 300b. The output signal of the Hall element was measured while the Hall element was moved in the "x" direction. The result of the measurement is indicated by the curve "x" in FIG. 15. In addition, the output signal of the Hall element was measured while the Hall dement was moved in the "y" direction. The result of the measurement is indicated by the curve "y" in FIG. 15. As shown by the curves "x" and "y" in FIG. 15, the rate of the variation in the output signal of the Hall element with respect to the displacement of the Hall element from the center of the cylindrical configuration in a given range was limited to 4% or less.

Figure 16:
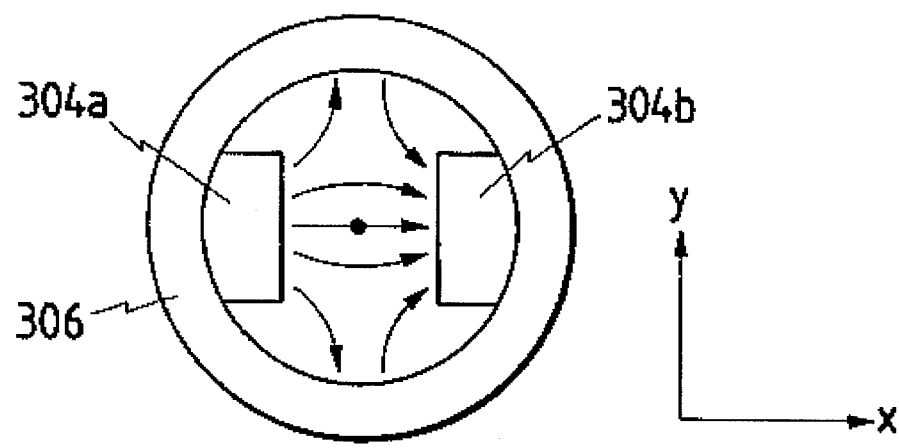
FIG. 16 is a plan view of another assembly of magnets and a rotor which is used during experiments.

During the experiments, as shown in FIG. 16, flat plate magnets 304a and 304b, on which an N pole and an S pole were provided respectively, were opposed to and separated from each other within a cylindrical iron rotor 306. A diametrical direction passing through the center of the cylindrical rotor 306 and being parallel to the direction of the magnetic field was defined as an "x" direction. A diametrical direction passing through the center of the cylindrical rotor 306 and being perpendicular to the "x" direction was defined as a "y" direction. A Hall element was disposed between the magnets 304a and 304b in the cylindrical rotor 306. The output signal of the Hall element was measured while the Hall element was moved in the "y" direction. The result of the measurement is indicated by the curve "y" in FIG. 17. In addition, the output signal of the Hall element was measured while the Hall element was moved in the "y" direction. The result of the measurement is indicated by the curve "y" in FIG. 17. As shown by the curves "x" and "y" in FIG. 17, the rate of the variation in the output signal of the Hall element with respect to the displacement of the Hall element from the center of the cylindrical rotor 306 in a given range was between −4% and +9%.

Figure 15:
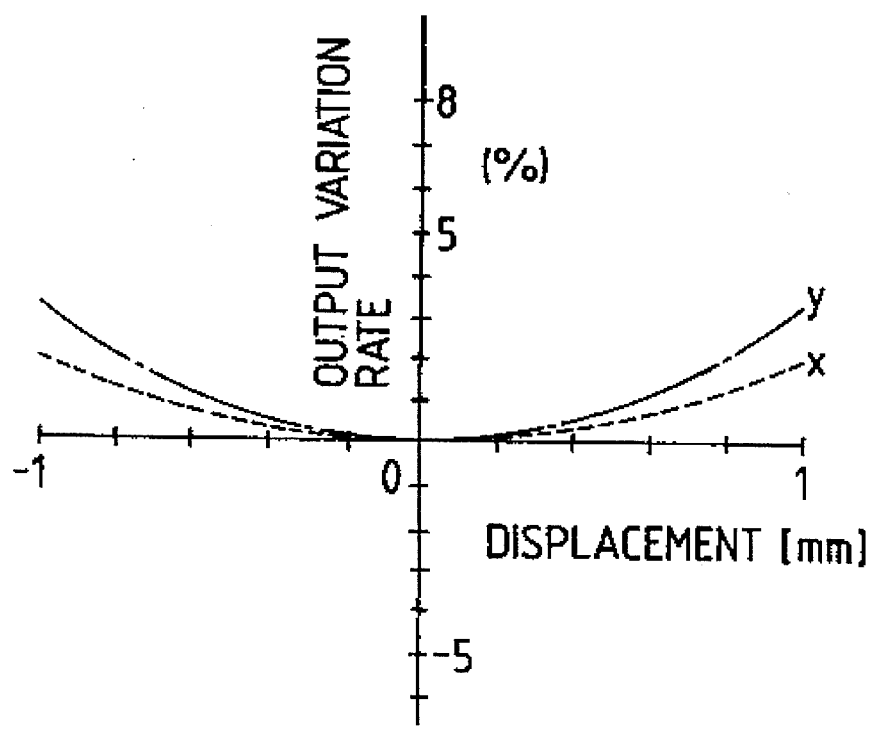
FIG. 15 is a diagram of the relation between the rate of a variation in the output signal of a Hall element and displacements of the Hall element which is obtained through the experiments related to FIG. 14.
Figure 17:
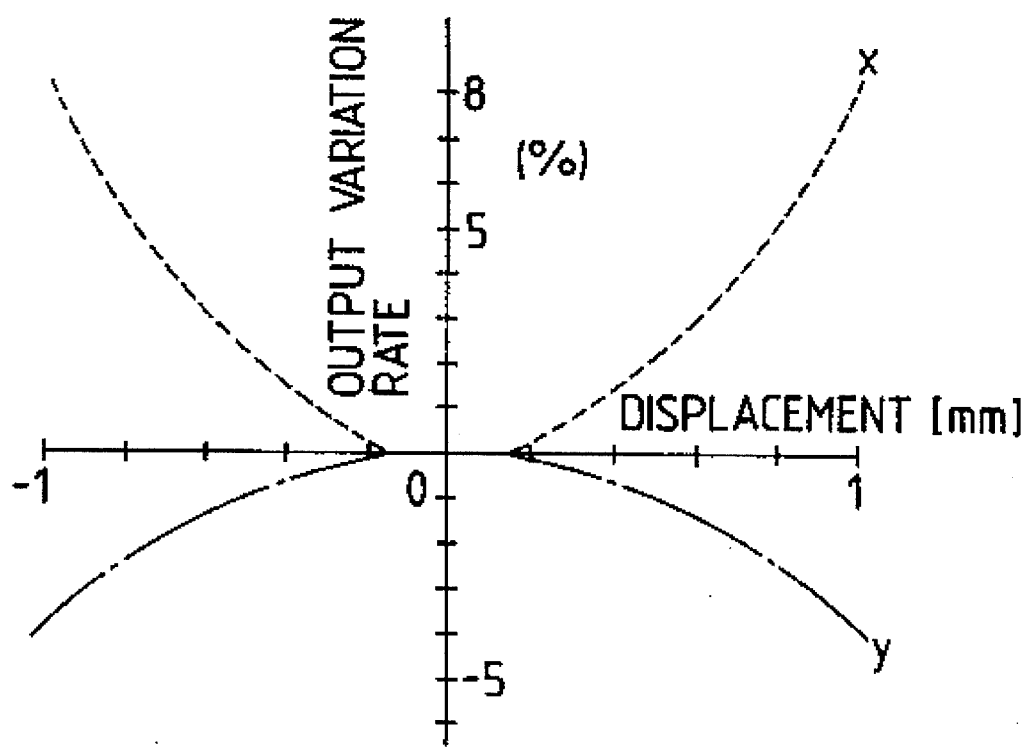
FIG. 17 is a diagram of the relation between the rate of a variation in the output signal of a Hall element and displacements of the Hall element which is obtained through the experiments related to FIG. 16.

As understood from the comparison between FIG. 15 and FIG. 17, the cylindrical magnet composed of the semicylindrical magnets 2a and 2b is advantageous in accuracy of the throttle position sensor.

As previously described, the magnets 2a and 2b are mounted on the shaft 4 of the throttle valve by the casing 6 which includes the retainer 12, the rotor 14, and the cisclip 16. Specifically, the magnets 2a and 2b are fixed to the shaft 4 by fitting the cisclip 16 into both the groove 14b in the rotor 14 and the groove 4a in the shaft 4. In addition, the retainer 12 is fitted onto the end of the shaft 4, and thereby desired setting is given of the angular position of the shaft 4 with respect to the direction of the magnetic field between the magnets 2a and 2b. Accordingly, assembling the magnets 2a and 2b in the casing 6 and also mounting the magnets 2a and 2b on the shaft 4 can be easily and accurately performed. Specifically, when the magnets 2a and 2b are forced into the rotor 14, the resin retainer 12 absorbs the stresses on the magnets 2a and 2b. Thus, it is unnecessary to use adhesive for fixing the magnets 2a and 2b in the rotor 14, and the magnets 2a and 2b can be easily mounted in the rotor 14.

As previously described, the retainer 12 is fitted onto the end of the shaft 4, and thereby desired setting is given of the angular position of the shaft 4 with respect to the direction of the magnetic field between the magnets 2a and 2b. Thus, when the casing 6 is mounted on the shaft 4, the magnets 2a and 2b are simultaneously located at their respective positions. Accordingly, it is possible to attain easy assembly of the throttle position sensor and accurate attachment of parts of the throttle position sensor.

As previously described, the two Hall elements 8a and 8b are disposed in the housing 10. Also, the two sensor circuit sections 50 and 60 for operating the Hall elements 8a and 8b respectively are disposed in the housing 10. The sensor circuit sections 50 and 60 output the two detection signals V1 and V2 representing the angular position of the throttle valve (the degree of opening through the throttle valve). By comparing the two detection signals V1 and V2, a malfunction of the throttle position sensor can be detected or diagnosed.

Malfunctions of the throttle position sensor are of a mechanical type and an electrical type. The rate of occurrence of mechanical malfunctions can be reduced toward zero as the safety factor is increased. Some electrical malfunctions are caused by defective electrical parts or poor soldering. The lines AA and BB in FIG. 12 denote examples of the relation between the sensor output signal and the throttle valve position which is present in the throttle position sensor having electrical malfunctions. If the throttle position sensor has only a single Hall element, it is generally difficult to detect a malfunction by referring to the sensor output characteristic curves AA and BB of FIG. 12. On the other hand, in this invention, there are the two Hall elements 8a and 8b and the two detection signals V1 and V2, and a malfunction causing a distinction between the detection signals V1 and V2 can be detected by comparing the detection signals V1 and V2.

As shown in FIG. 11, the power feed lines consist of the Vcc line and the Gnd line extending from the terminals 24c and 24d respectively. The Vcc line is separated, on the printed circuit board 27, into two power supply lines connected to the circuit sections 50 and 60 respectively. In addition, the Gnd line is separated, on the printed circuit board 27, into two ground lines connected to the circuit sections 50 and 60 respectively. Thus, the terminals 24c and 24d are used in common by the circuit sections 50 and 60 so that a smaller number of necessary terminals can be realized. The smaller number of necessary terminals results in a smaller size of the throttle position sensor and also a reduction of the cost thereof.

The detection signal voltages V1 and V2 are designed so that they will vary between a predetermined upper limit and a predetermined lower limit as the throttle valve rotates through the angular range to be detected. The lower limit is higher than 0 volt. The upper limit is lower than the positive power supply voltage Vcc. The throttle-valve angular range to be detected extends between 0 degree and 90 degrees. In the case of a malfunction where one of the separated portions of the Vcc line breaks, there occurs a distinction between the detection signals V1 and V2. Thus, such a malfunction can be detected by comparing the detection signals V1 and V2. In the case of a malfunction where the common portion of the Vcc line breaks, both the voltages of the detection signals V1 and V2 drop to 0 volt. Such a malfunction can be detected by comparing the detection signals V1 and V2 with a voltage of 0 volt. A malfunction of another type can be detected by comparing the detection signals V1 and V2 with a voltage equal to the previously-mentioned upper limit.

As previously described, the Hall elements 8a and 8b are symmetrical with respect to the rotation axis of the rotor 14 (the rotation axis of the shaft 4 of the throttle valve) and are parallel to planes along the rotation axis of the rotor 14. Thus, the magnetic sensitive planes of the Hall elements 8a and 8b are exposed to portions of the magnetic fields which have substantially equal intensities, and the detection signals V1 and V2 are essentially equal to each other. This design enables accurate detection or diagnosis of a malfunction in response to comparison between the detection signals V1 and V2.

The rare-earth material such as Nd-Fe-B based material for the magnets 2a and 2b enables a small volume of the magnets 2a and 2b to generate an adequately strong magnetic field. The small volume of the magnets 2a and 2b results in a small size of the throttle position sensor and a light weight thereof.

As previously described, the terminals 32 on the housing 10 are electrically connected to the terminals 24 on the printed circuit board 27 via the feed-through capacitors 18. The feed-through capacitors 18 remove noise travelling from the terminals 32 toward the terminals 24. The noise removal enables a higher detection accuracy of the throttle position sensor.

As previously described, the Hall elements 8a and 8b are retained within the holder 25, and are thereby supported on the printed circuit board 27. Thus, it is easy to locate the Hall elements 8a and 8b at their respective positions. In addition, the holder 25 prevents leads of the Hall elements 8a and 8b from being twisted by various causes such as a temperature-responsive deformation, a vibration, or a stress. Thus, the holder 25 lengthens the lives of the leads of the Hall elements 8a and 8b.

Figure 18:
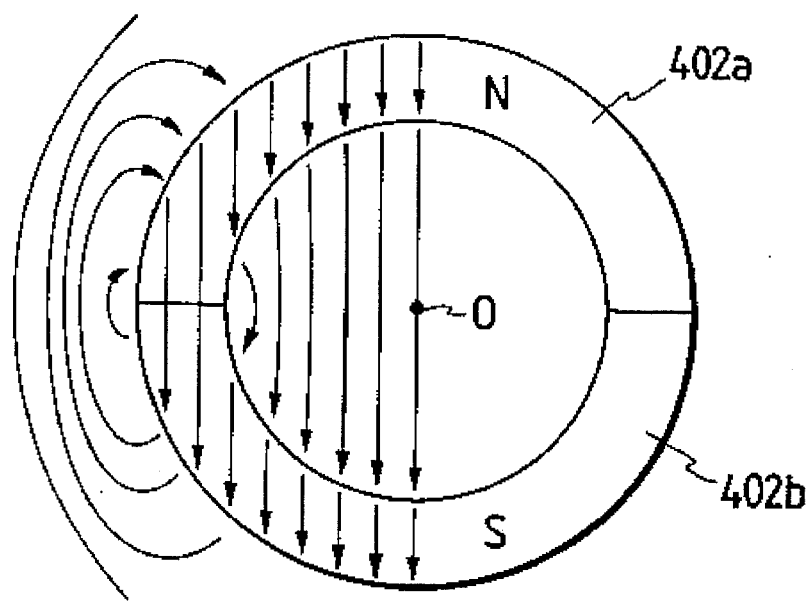
FIG. 18 is a plan view of the magnets and magnetic flux lines in a throttle position sensor according to a second embodiment of this invention.

FIG. 18 shows a second embodiment of this invention which is similar to the embodiment of FIGS. 1–17 except for the following design changes. The embodiment of FIG. 18 uses semicylindrical magnets 402a and 402b instead of the magnets 2a and 2b (see FIGS. 1–3). Adjacent ends of the magnets 402a and 402b are in contact with each other, and there is no gap therebetween. To this end, the embodiment of FIG. 18 uses a modified retainer for the magnets 402a and 402b.

Figure 19:
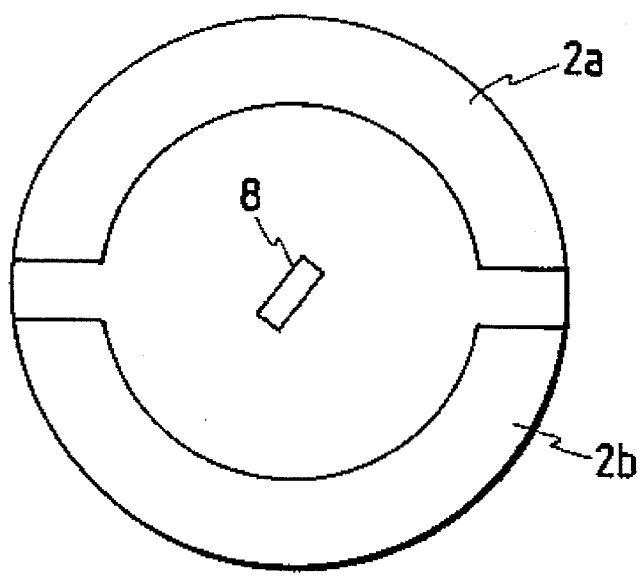
FIG. 19 is a plan view of the magnets and a Hall element in a throttle position sensor according to a third embodiment of this invention.

FIG. 19 shows a third embodiment of this invention which is similar to the embodiment of FIGS. 1–17 except for the following design changes. The embodiment of FIG. 19 has only a single Hall element 8 essentially centered within the cylindrical configuration of the semicylindrical magnets 2a and 2b. The Hall element 8 is electrically connected to the sensor circuit section 50. The other sensor circuit section 60 is omitted from this embodiment.

Figure 20:
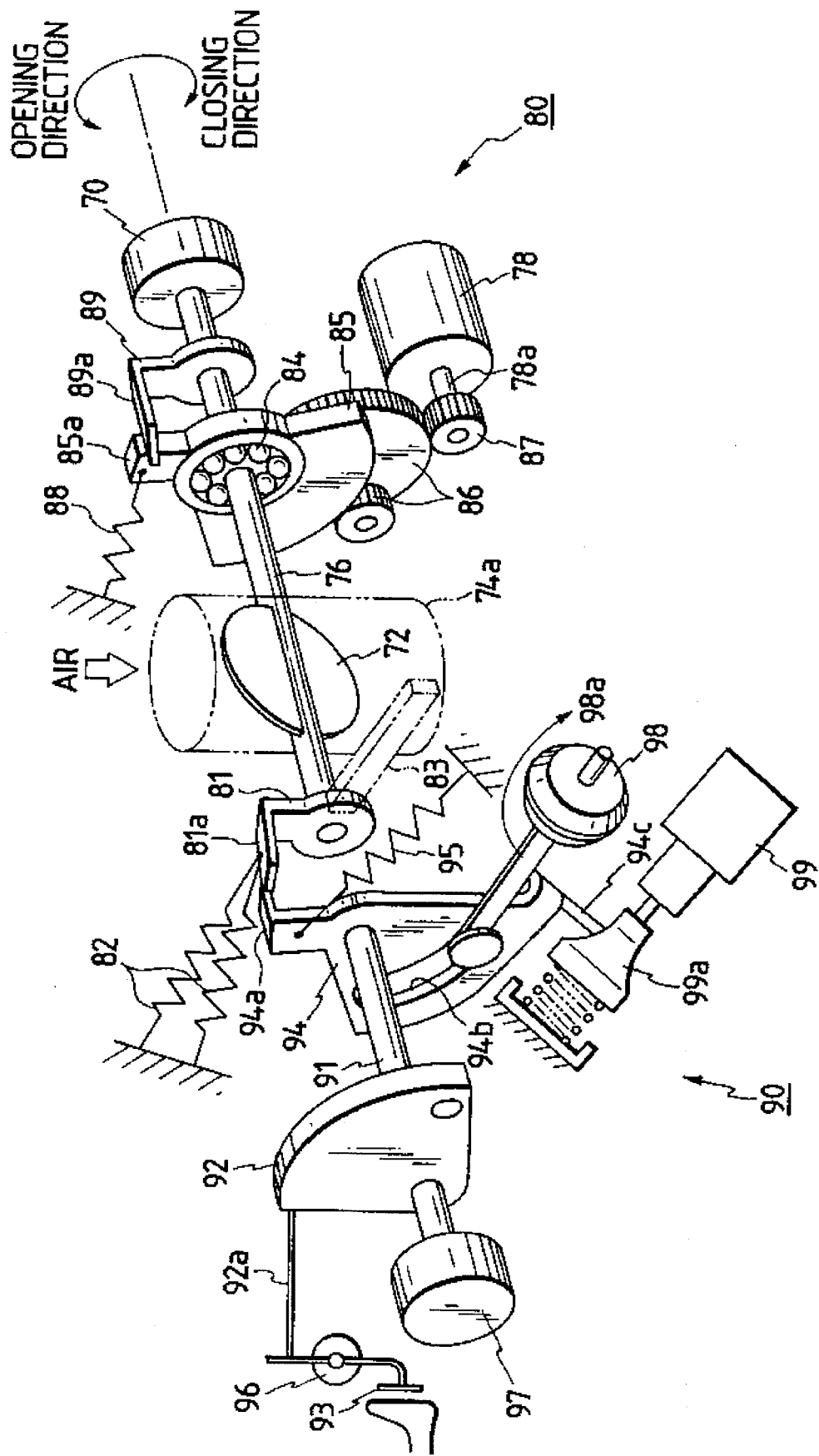
FIG. 20 is a perspective diagram of an apparatus according to a fourth embodiment of this invention.
Figure 21:
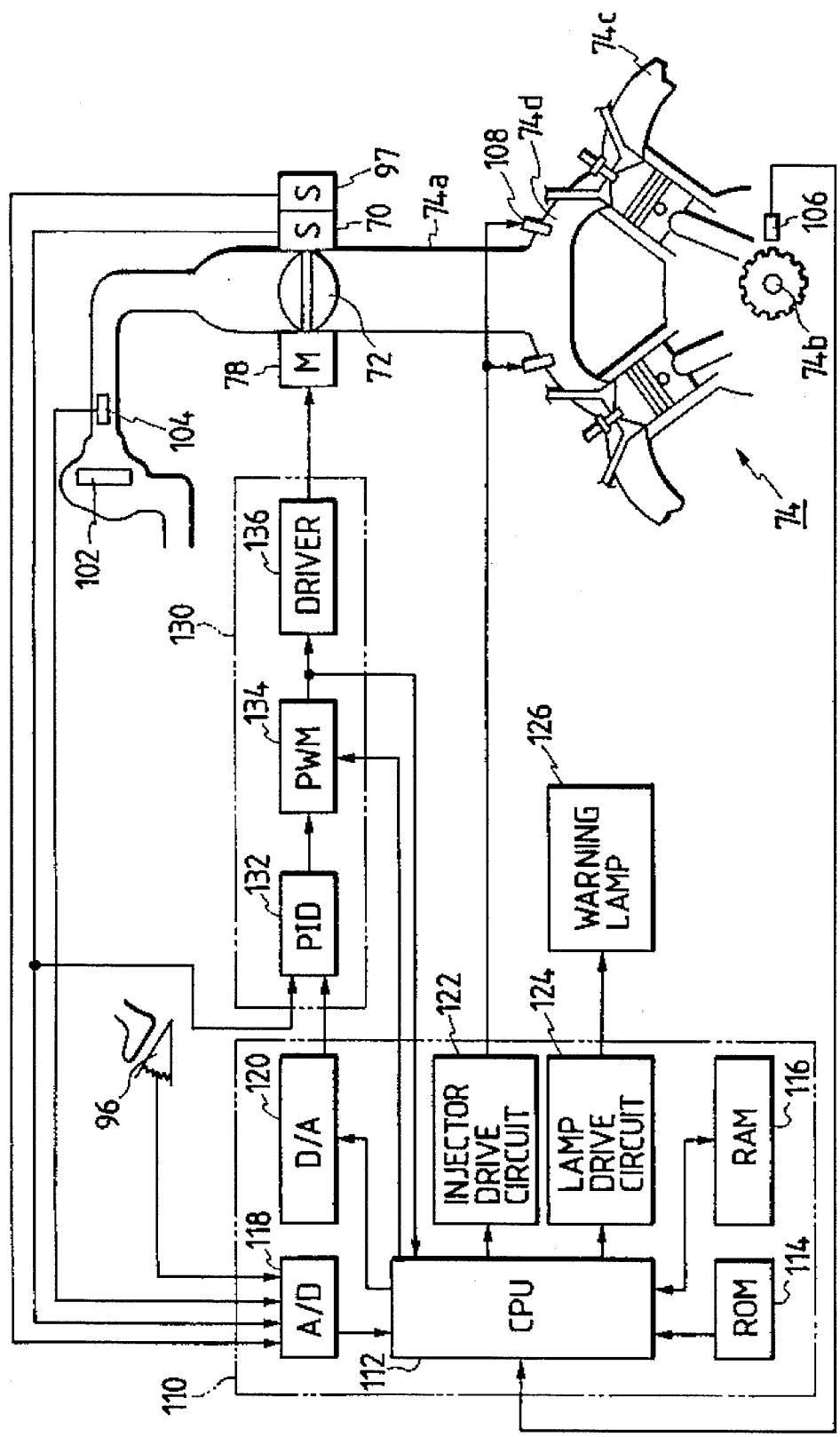
FIG. 21 is a diagram of an electric portion of the apparatus according to the fourth embodiment of the invention.

With reference to FIGS. 20 and 21, a throttle position sensor 70 is connected to a throttle valve 72. The throttle position sensor 70 can be one of the throttle position sensors in the embodiments of FIGS. 1–18. The throttle position sensor 70 can also be of a type having three or more Hall elements.

The throttle valve 72 is fixed to a throttle shaft 76 rotatably extending through an air induction passage 74a of an internal combustion engine 74 generally designed to power an automotive vehicle. The throttle valve 72 rotates together with the throttle shaft 76, blocking and unblocking the air induction passage 74a to adjust the rate of air flow in the air induction passage 74a. The degree of opening through the throttle valve 72 depends on the angular position of the throttle valve 72.

A motor drive mechanism 80 and an accelerator linking mechanism 90 are connected to the throttle valve 72. The motor drive mechanism 80 enables the throttle valve 72 to be driven by a DC motor 78. The accelerator linking mechanism 90 enables the throttle valve 72 to be driven in response to movement of an accelerator pedal 93.

The motor drive mechanism 80 will now be described in detail. Right-hand and left-hand ends of the throttle shaft 76 extend outward from the air induction passage 74a. A stopper lever 81 is mounted on the left-hand end of the throttle shaft 76. The stopper lever 81 has an L-shaped bent portion 81a. First ends of valve springs 82 are connected to bent portion 81a, and the second ends thereof are connected to a fixed body such as a vehicle body. The valve springs 82 urge the throttle shaft 76 in the direction of opening the throttle valve 72 (which is also simply referred to as "the valve opening direction"). The bent portion 81a of the stopper lever 81 can engage a fixed stopper 83 which determines a fully-closed position of the throttle valve 72. As the throttle valve 72 is closed, the bent portion 81a of the stopper lever 81 rotates toward the stopper 83. The throttle valve 72 is stopped when the bent portion 81a meets the stopper 83. The position at which the throttle valve 72 is stopped is defined as the fully-closed position of the throttle valve 72.

A gear 85 having a sector shape is rotatably supported on the right-hand end of the throttle shaft 76 by a bearing 84. The gear 85 is connected with a gear 87 via speed-reducing intermediate gears 86. The gear 87 is fixed to the output shaft 78a of the DC motor 78. The DC motor 78 can drive and rotate the gear 85 in the direction of closing the throttle valve 72 (which is also simply referred to as "the valve closing direction"). The gear 85 has a projection forming an engagement portion 85a. A return spring 88 connected to the engagement portion 85a urges the gear 85 in the direction of opening the throttle valve 72.

An engagement lever 89 having an L-shaped bent portion 89a is secured to the right-hand end of the throttle shaft 76. The bent portion 89a of the engagement lever 89 is located at such a side of the engagement portion 85a of the gear 85 that the engagement portion 85a can encounter the bent portion 89a when the gear 85 rotates in the direction of closing the throttle valve 72. The valve springs 82 urge the throttle shaft 76 in the valve opening direction so that the bent portion 89a of The engagement lever 89 can be brought into contact with the engagement portion 85a of the gear 85. When the DC motor 78 is energized, the gear 85 is rotated in the valve closing direction against the forces of the return spring 88 and the valve springs 82. Simultaneously, the throttle valve 72 is closed while being rotated together with the engagement lever 89 and the throttle shaft 76. When the DC motor 78 is de-energized, the throttle valve 72 is allowed to open by the forces of the valve springs 82 and the gear 85 is allowed to move in the valve opening direction by the force of the return spring 88.

The throttle position sensor 70 is connected to the right-hand end of the throttle shaft 76. The throttle position sensor 70 outputs detection signals V1 and V2 representing the angular position of the throttle valve 72 or the degree of opening of the throttle valve 72.

The accelerator linking mechanism 90 will now be described in detail. A rotatably-supported guard shaft 91 axially aligns with the throttle shaft 76. The guard shaft 91 extends leftward of the throttle shaft 76. An accelerator lever 92 secured to the guard shaft 91 is connected to the accelerator pedal 93 via a control cable 92a. A guard lever 94 fixed to the right-hand end of the guard shaft 91 is urged by a guard spring 95 in the direction of closing the throttle valve 72. The force of the guard spring 95 is sufficiently stronger than the resultant of the forces of the valve springs 82. When the accelerator pedal 93 is depressed, the guard lever 94 rotates together with the accelerator lever 92 and the guard shaft 91 in the direction of opening the throttle valve 72 against the force of the guard spring 95.

An accelerator position sensor 96 associated with the accelerator pedal 93 outputs a detection signal representing the accelerator operated amount Ap or the degree of depression of the accelerator pedal 93. According to throttle control which will be described later, the throttle valve 72 is driven by the DC motor 78 in response to the detected accelerator operated amount Ap. In general, the throttle control increases the throttle opening degree with an increase in the throttle operated amount Ap.

As previously described, the guard lever 94 is rotated in the direction of opening the throttle valve 72 when the accelerator pedal 93 is depressed. The guard lever 94 has an L-shaped bent portion 94a which can engage the bent portion 81a of the stopper lever 81. The bent portion 94a of the guard lever 94 is located at a side of the bent portion 81a of the stopper lever 81 such that the bent portion 81a can encounter the bent portion 94a when the stopper lever 81 rotates in the direction of opening the throttle valve 72. A given amount of play can be provided between the bent portion 81a of the stopper lever 81 and the bent portion 94a of the guard lever 94. The given play is maintained when the throttle shaft 76 and the guard shaft 91 rotate in the same direction.

As will be described later, in the event of a malfunction of the throttle control such as a malfunction of the throttle position sensor 70, the DC motor 78 is de-energized so that the throttle valve 72 is opened slightly wider by the forces of the valve springs 82. In this case, the bent portion 81a of the stopper lever 81 encounters the bent portion 94a of the guard lever 94, thereby preventing the throttle valve 72 from being opened further. Thus, the degree of opening of the throttle valve 72 is limited to a guard degree (a guard position) or less which is determined by the guard lever 94. In such an abnormal case, as the guard shaft 91 is rotated by movement of the accelerator pedal 93, the stopper lever 81 rotates together with the guard lever 94 so that the throttle valve 72 also rotates. Thus, the throttle valve 72 is driven in response to movement of the accelerator pedal 93 by the accelerator linking mechanism 90. A position sensor 97 connected to the left-hand end of the guard shaft 91 outputs a detection signal representing the guard position.

The guard lever 94 has an elongated opening 94b which extends circumferentially with respect to the guard shaft 91. An operation rod 98a of a diaphragm actuator 98 has an end which slidably fits in the elongated opening 94b of the guard lever 94. During normal running conditions of the vehicle, the operation rod 98a of the diaphragm actuator 98 remains in an extended position so that the guard lever 94 rotates in response to movement of the accelerator pedal 93 while the end of the operation rod 98a of the diaphragm actuator 98 slides along the elongated opening 94b in the guard lever 94. During cruise-control running conditions of the vehicle, the operation rod 98a of the diaphragm actuator 98 remains in a contracted position so that the guard lever 94 is held by the diaphragm actuator 98 at a position corresponding to a widely open state of the throttle valve 72. Thus, the guard position is greatly changed in the direction of opening the throttle valve 72, and the throttle valve 72 is driven by the DC motor 78 independent of the accelerator linking mechanism 90 so that the vehicle speed can be maintained at a target cruise speed.

The guard lever 94 has a projection 94c which can engage an operation rod 99a of a thermo-wax device 99. The operation rod 99a of the thermo-wax device 99 extends and contracts in accordance with the temperature of coolant of the engine 74. When the engine 74 is warm and the coolant temperature is high, the operation rod 99a of the thermo-wax device 99 is in an extended position so that the guard lever 94 is allowed to rotate in response to movement of the accelerator pedal 93. When the engine 74 is cold and the coolant temperature is low, the operation rod 99a of the thermo-wax device 99 is in a contracted position so that the guard lever 94 is held by the thermo-wax device 99 at a position corresponding to a given open state of the throttle valve 72. Thus, the guard position is changed in the direction of opening the throttle valve 72, and the throttle valve 72 is driven by the DC motor 78 independent of the accelerator linking mechanism 90 so that an idle-up process can be executed.

With reference to FIG. 21, the engine 74 has six combustion chambers or cylinders which are arranged in a V-configuration. The throttle position sensor 70, the accelerator position sensor 96, and the guard position sensor 97 are associated with the engine 74. In addition, an air flow meter 104, a crank angle sensor 106, a coolant temperature sensor (not shown), an A/F (air-to-fuel) ratio sensor (not shown), and other sensors (not shown) are associated with the engine 74. The air flow meter 104 outputs a detection signal representing the rate of air flow in the air induction passage 74a which extends from an air cleaner 102 to the engine combustion chambers. The crank angle sensor 106 is associated with the crankshaft 74b of the engine 74. During rotation of the crankshaft 74b, the crank angle sensor 106 outputs an electric pulse at each of predetermined angular positions of the crankshaft 74b which are equally spaced by angular intervals of 30 degrees. The coolant temperature sensor outputs a detection signal representing the temperature of the coolant of the engine 74. The A/F ratio sensor detects the oxygen concentration in exhaust gas in the exhaust passage 74c of the engine 74. Since the oxygen concentration in the exhaust gas depends on the A/F ratio of an air-fuel mixture causing the exhaust gas, the A/F ratio sensor outputs a detection signal representing the A/F ratio of the air-fuel mixture.

An electronic control circuit 110 receives the detection signals from the sensors including the throttle position sensor 70, the accelerator position sensor 96, the guard position sensor 97, the air flow meter 104, and the crank angle sensor 106. The electronic control circuit 110 controls fuel injectors 108, the DC motor 78, and a warning lamp 126 in response to the sensor output signals. The fuel injectors 108 are provided in air intake ports 74d leading to the combustion chambers of the engine 74 respectively. The control of the fuel injectors 108 provides adjustment of the rate of fuel injection into the engine 74. The control of the DC motor 78 provides adjustment of the degree of opening of the throttle valve 72. The warning lamp 126 is located, for example, on a vehicle instrument panel.

The electronic control circuit 110 includes a combination of a CPU 112, a ROM 114, a RAM 116, an A/D conversion circuit 118, a D/A conversion circuit 120, an injector drive circuit 122, and a lamp drive circuit 124. The CPU 112 operates in accordance with a program stored in the ROM 114. The A/D conversion circuit 118 changes the detection output signals of the throttle position sensor 70, the accelerator position sensor 96, the guard position sensor 97, and the air flow meter 104 into corresponding digital signals fed to the CPU 112. The RAM 116 temporarily stores data handled and processed by the CPU 112. The injector drive circuit 122 activates and deactivates the fuel injectors 108 in response to a digital control signal fed from the CPU 112. The lamp drive circuit 124 activates and deactivates the warning lamp 126 in response to a digital control signal fed from the CPU 112. A motor-control digital signal outputted from the CPU 112 is changed by the D/A conversion circuit 120 into a corresponding analog control signal which is used in the control of the DC motor 78. The CPU 112 directly receives the detection signal from the crank angle sensor 106. In addition, the CPU 112 directly receives an output signal of a PWM (pulse-width modulation) circuit 134, and directly outputs a control signal to the PWM circuit 134.

The CPU 112 derives the current engine speed (the rotational speed of the crankshaft 74b) Ne from the output signal of the crank angle sensor 106. The CPU 112 derives the current air flow rate Qa from the output signal of the air flow meter 104. The CPU 112 determines a desired fuel injection rate in accordance with the current engine speed Ne and the current air flow rate Qa. The CPU 112 generates a digital fuel injection control signal in response to the desired fuel injection rate, and outputs the control signal to the injector drive circuit 122 to execute control of the fuel injection rate.

In the event of a malfunction of the throttle control, the CPU 112 determines the number Nfc of engine cylinders to be subjected to fuel cut. The fuel-cut cylinder number Nfc is equal to an integer in the range of 0 to 6. The CPU 112 modifies the control signal to the injector drive circuit 122 in accordance with the fuel-cut cylinder number Nfc so that fuel supply to a corresponding number of engine cylinders will be cut off.

The CPU 112 determines a target degree of opening of the throttle valve 72 in accordance with operating conditions of the engine 74 which are represented by the detection output signals of the sensors including the throttle position sensor 70, the accelerator position sensor 96, the guard position sensor 97, the air flow meter 104, and the crank angle sensor 106. The CPU 112 sets a throttle command value in response to the target degree of opening of the throttle valve 72. The CPU 112 outputs a digital signal representative of the throttle command value to the D/A conversion circuit 120. The digital signal representative of the throttle command value is changed by the D/A conversion circuit 120 into a corresponding throttle command voltage Vcmd fed to a motor drive circuit 130 connected to the DC motor 78. Thereby, control of the degree of opening of the throttle valve 72 is executed via the motor drive circuit 130.

The motor drive circuit 130 includes a PID (proportional, integral, and differential) control circuit 132, the PWM circuit 134, and a driver 136. The PID control circuit 132 receives the throttle command voltage Vcmd from the electronic control circuit 110. The throttle command voltage Vcmd denotes the target degree of opening of the throttle valve 72. The PID control circuit 132 also receives the detection output signal V1 or V2 of the throttle position sensor 70 which represents the actual degree of opening of the throttle valve 72. The PID control circuit 132 derives a difference between the target degree and the actual degree of opening of the throttle valve 72, executing proportional, integral, and differential processes and determining a target controlled amount of the DC motor 78 which is designed to reduce the difference between the target degree and the actual degree of opening of the throttle valve 72. The PID control circuit 132 outputs a signal to the PWM circuit 134 which represents the target controlled amount of the DC motor 78. The PWM circuit 134 generates a fixed-frequency pulse signal in response to the output signal of the PID control circuit 132, the pulse signal having a duty factor or cycle corresponding to the target controlled amount of the DC motor 78. The PWM circuit 134 outputs the pulse signal to the driver 136. The driver 136 activates and deactivates the DC motor 78 in response to the output pulse signal of the PWM circuit 134. Thus, the throttle valve 72 is controlled via the DC motor 78 according to the operation of the motor drive circuit 130. In addition, the PWM circuit 134 outputs the pulse signal to the CPU 112 within the electronic control circuit 110.

During the execution of the throttle control, the CPU 112 performs an abnormality judgment on the throttle position sensor 70. In the event of a malfunction of the throttle position sensor 70, the CPU 112 outputs control signals to the lamp drive circuit 124 and the PWM circuit 134 so that the warning lamp 126 will be activated and operation of the DC motor 78 will be suspended.

As previously described, the CPU 112 operates in accordance with the program stored in the ROM 114. FIG. 22 is a flowchart of a throttle control routine of the program which is reiteratively executed together (successively) with a fuel injection rate control routine of the program.

The throttle control routine of the program will now be described. As shown in FIG. 22, a first step 200 of the throttle control routine derives the current engine speed Ne from the output signal of the crank angle sensor 106. In addition, the step 200 derives the present voltage values V1 and V2 of the detection output signals of the throttle position sensor 70. Furthermore, the step 200 derives the current accelerator controlled mount Ap from the output signal of the accelerator position sensor 96.

A step 210 following the step 200 calculates the difference $\Delta V$ between the throttle position values V1 and V2, and also calculates the absolute value $|\Delta V|$ of the difference $\Delta V$. The step 210 compares the absolute value $|\Delta V|$ with a predetermined positive reference value $\Delta Vo$. When the absolute value $|\Delta V|$ exceeds the reference value $\Delta Vo$, the throttle position sensor 70 is decided to be malfunctioning and the program advances from the step 210 to a step 270. Otherwise, the program advances from the step 210 to a step 220.

The step 220 determines whether or not the throttle position value V1 is in the range of a predetermined lower limit value V1L to a predetermined upper limit value V1H. When the throttle position value V1 is not in the range of the lower limit value V1L to the upper limit value V1H, the throttle position sensor 70 is decided to be malfunctioning and the program advances from the step 220 to the step 270. Otherwise, the program advances from the step 220 to a step 230.

The step 230 determines whether or not the throttle position value V2 is in the range of a predetermined lower limit value V2L to a predetermined upper limit value V2H. When the throttle position value V2 is not in the range of the lower limit value V2L to the upper limit value V2H, the throttle position sensor 70 is decided to be malfunctioning and the program advances from the step 230 to the step 270. Otherwise, the program advances from the step 230 to a step 240. The lower limit value V2L and the upper limit value V2H are preferably equal to the lower limit value V1L and the upper limit value V1H respectively.

When the program successively passes through the steps 210, 220, and 230 and then enters the step 240, the throttle position sensor 70 is decided to be operating normally and therefore control of the DC motor 78 in response to the output signal of the throttle position sensor 70 is executed.

Specifically, the step 240 determines a throttle opening degree command value θcmd in accordance with the current engine speed Ne and the current accelerator operated amount Ap given by the previous step 200. The throttle opening degree command value θcmd agrees with a target degree of opening of the throttle valve 72. A step 250 following the step 240 calculates a throttle command voltage value Vcmd from the throttle opening degree command value θcmd. A step 260 following the step 250 outputs a digital signal representative of the throttle command voltage value Vcmd to the D/A conversion circuit 120. The D/A conversion circuit 120 changes the digital signal into an analog voltage signal which corresponds to the throttle command voltage value Vcmd. The D/A conversion circuit 120 outputs the analog voltage signal to the PID control circuit 132 of the motor drive circuit 130. After the step 260, the current execution cycle of the throttle control routine ends and the program returns to a main routine.

Thus, where the throttle position sensor 70 operates normally, the motor drive circuit 130 controls the DC motor 78 in response to the outpost signals of the throttle position sensor 70 and the D/A conversion circuit 120 so that the output detection voltage V1 of the throttle position sensor 70 can be equal to the command voltage Vcmd. As a result, the actual degree of opening of the throttle valve 72 can be controlled at the throttle opening degree command value θcmd.

When the steps 210, 220, and 230 decide the throttle position sensor 70 to be malfunctioning, the program advances to the step 270 as previously described. The step 270 outputs a control signal to the lamp drive circuit 124 so that the warning lamp 126 will be activated to indicate a malfunction of the throttle position sensor 70. A step 280 following the step 270 outputs a control signal to the PWM circuit 134 so that the duty factor of the output pulse signal of the PWM circuit 134 will be set to 0% to continuously deactivate the DC motor 78. After the step 280, the current execution cycle of the throttle control routine ends and the program returns to the main routine.

Thus, in the event of a malfunction of the throttle position sensor 70, the DC motor 78 remains continuously deactivated and thus it is possible to prevent the DC motor 78 from being driven in response to an improper detection output signal of the throttle position sensor 70. When the DC motor 78 is continuously deactivated, the throttle valve 72 is rotated by the valve springs 82 in the valve opening direction until the bent portion 81a of the stopper lever 81 contacts the bent portion 94a of the guard lever 94. Thus, the accelerator linking mechanism 90 is enabled so that the throttle valve 72 can be controlled via the accelerator linking mechanism 90 in response to movement of the accelerator pedal 93.

As previously described, the steps 220 and 230 detect malfunctions of the throttle position sensor 70 by comparing the voltage levels of the detection signals V1 and V2 with the predetermined voltage ranges. The step 210 detects a malfunction of the throttle position sensor 70 by comparing the voltage levels of the detection signals V1 and V2 with each other. Specifically, the step 210 calculates the difference $\Delta V$ between the throttle position values V1 and V2, and also calculates the absolute value $|\Delta V|$ of the difference $\Delta V$. The step 210 compares the absolute value $|\Delta V|$ with the predetermined positive reference value $\Delta Vo$ to detect a malfunction of the throttle position sensor 70. Thus, various types of malfunctions of the throttle position sensor 70 can be reliably detected by the steps 210, 220, and 230.

FIG. 23 shows a fifth embodiment of this invention which is similar to the embodiment of FIGS. 20–22 except for design changes indicated hereinafter. In the embodiment of FIG. 23, an electronic control circuit 110 includes a load circuit 140 connected between a throttle position sensor 70 and an A/D conversion circuit 118. Load resistors RL1 and RL2 and a capacitor C1 (see FIG. 11) are removed from the throttle position sensor 70 to the load circuit 140.

What is claimed is:

1. An electric control apparatus comprising:

magnetic flux generating element having opposing portions for generating a given quantity of magnetic flux;

a first magnetic-to-electric transducer element, wherein one of the magnetic flux generating element and the first magnetic-to-electric transducer element is movable relative to the other, the first magnetic-to-electric transducer element being operative for detecting a magnitude of the magnetic flux which is responsive to relative motion between the magnetic flux generating element and the first magnetic-to-electric transducer element and outputting a first detection signal in response to the relative motion between the magnetic flux generating element and the first magnetic-to-electric transducer element, the first magnetic-to-electric transducer element being located proximate to the magnetic flux generating element so as to detect the magnetic flux;

a second magnetic-to-electric transducer element, wherein one of the magnetic flux generating element and the second magnetic-to-electric transducer element is moveable relative to the other, the second magnetic-to-electric transducer element being operative for detecting the magnitude of a magnetic flux which is responsive to relative motion between the magnetic flux generating element and the second magnetic-to-electric transducer element and outputting a second detection signal in response to the relative motion between the magnetic flux generating element and the second magnetic-to-electric transducer element, the second magnetic-to-electric transducer element being located proximate to the magnetic flux generating element so as to detect the magnetic flux; and control signal outputting means, operatively connected to the first magnetic-to-electric transducer element and the second magnetic-to-electric transducer element, for comparing the first detection signal output from the first magnetic-to-electric transducer element and the second detection signal output from the second magnetic-to-electric transducer element with each other to detect a difference therebetween, and for outputting a condition normal signal when the detected difference between the first detection signal and the second detection signal agrees with a predetermined relation.

2. The electric control apparatus of claim 1, wherein the control signal outputting means further comprises:

reference signal comparing means for comparing the difference between the first and second detection signals detected by the control signal outputting means with a reference signal, the control signal outputting means outputting the condition normal signal when the difference between the first and second detection signals is equal to or less than the reference signal.

3. The electric control apparatus of claim 1, wherein the control signal outputting means further comprises reference signal comparing means for comparing the difference between the first and second detection signals detected by the control signal outputting means with a reference signal, the control signal outputting means outputting a malfunction signal when the difference between the first and second detection signals is greater than the reference signal.

4. The electric control apparatus of claim 1, wherein the control signal outputting means also outputs a malfunction signal when the relation between the detection signals agrees with a second predetermined relation, the second predetermined relation being different from the first predetermined relation.

5. The electric control apparatus of claim 4, wherein conditions where relation between the detection signals agrees with the predetermined relation correspond to conditions where the difference between the magnitudes of the detection signals is equal to or less than a predetermined value.

6. The electric control apparatus of claim 1, wherein the control signal outputting means also outputs a position signal representative of a position of the magnetic flux generating means relative to the first and second magnetic-to-electric transducer elements.

7. The electric control apparatus of claim 1, wherein each of the first and second magnetic-to-electric transducer elements comprises a Hall element.

8. The electric control apparatus of claim 1, wherein the control signal outputting means mutually processes the detection signals output from the first and the second magnetic-to-electric transducer elements, and outputs a position signal representative of a position of the magnetic flux generating means relative to the first and second magnetic-to-electric transducer elements as the control signal based on a result of said processing.

9. An electric control apparatus comprising:

a magnetic flux generating element having opposing portions for generating a given quantity of magnetic flux;

a first magnetic-to-electric transducer element, wherein one of the magnetic flux generating element and the first magnetic-to-electric transducer element is movable relative to the other, the first magnetic-to-electric transducer element being operative for detecting a magnitude of the magnetic flux which is responsive to relative motion between the magnetic flux generating element and the first magnetic-to-electric transducer element and outputting a first detection signal in response to the relative motion between the magnetic flux generating element and the first magnetic-to-electric transducer element, the first magnetic-to-electric transducer element being located proximate to the magnetic flux generating element so as to detect the magnetic flux;

a second magnetic-to-electric transducer element, wherein one of the magnetic flux generating element and the second magnetic-to-electric transducer element is movable relative to the other, the second magnetic-to-electric transducer element being operative for detecting a magnitude of the magnetic flux which is responsive to relative motion between the magnetic flux generating element and the second magnetic-to-electric transducer element and outputting a second detection signal in response to the relative motion between the magnetic flux generating element and the second magnetic-to-electric transducer element, the second magnetic-to-electric transducer element being located proximate to the magnetic flux generating element so as to detect the magnetic flux;

control signal outputting means for comparing the first detection signal output from the first magnetic-to-electric transducer element and the second detection signal output from the second magnetic-to-electric transducer element with each other to detect a difference therebetween, and for outputting a condition normal signal when the detected difference between the first and second detection signals agrees with a predetermined relation; and a rotatable body, wherein one of the magnetic flux generating element and the first and second magnetic-to-electric transducer elements is mounted on the rotatable body such that the magnitude of the magnetic flux which is detected by the first magnetic-to-electric transducer element varies in response to the rotation of the rotatable body, and the magnitude of the magnetic flux which is detected by the second magnetic-to-electric transducer element varies in response to the rotation of the rotatable body.

10. The electric control apparatus of claim 9, wherein the rotatable body comprises a rod member.

11. The electric control apparatus of claim 10, wherein the magnetic flux generating means is formed in a hollow cylinder concentrically located on an axis of rotation of the rod member, and is operative to generate the magnetic flux from one side of the cylinder to another side of the cylinder.

12. The electric control apparatus of claim 11, wherein said one of the cylinder and said another side of the cylinder are spaced from each other by gaps.

13. The electric control apparatus of claim 11, wherein the first magnetic-to-electric transducer element and the second magnetic-to-electric transducer element are located within a central portion of the cylinder.

14. The electric control apparatus of claim 13, further comprising a fixing member for fixing an end of the rod member and the magnetic flux generating means to each other.

15. The electric control apparatus of claim 14, wherein the end of the rod member has a groove circumferential with respect to the rotation axis, and the fixing member comprises a retainer made of synthetic resin which is formed in a hollow cylinder having a diameter approximately equal to a diameter of the magnetic flux generating means and which has a wall surface formed with a hole accommodating the magnetic flux generating means therein, a rotor made of magnetic material which is formed in a cylinder having a hollow accommodating the retainer and which has a circumferential groove in an inner surface of the hollow, and a cisclip fitting in both the groove in the rotor and the groove in the rod member and fixing the rotor to the end of the rod member.

16. The electric control apparatus of claim 14, further comprising a second fixing member separate from the fixing member and holding the first and second magnetic-to-electric transducer elements to position the first and second magnetic-to-electric transducer elements in the magnetic flux generating means.

17. The electric control apparatus of claim 13, further comprising a cover made of magnetic material which isolates the first and the second magnetic-to-electric transducer elements and the magnetic flux generating means from an external magnetic field.

18. The electric control apparatus of claim 10, wherein the rod member comprises a throttle shaft for rotating a throttle valve in an air induction passage.

19. An electric control apparatus comprising:

a magnetic flux generating element having opposing portions for generating a given quantity of magnetic flux;

a first magnetic-to-electric transducer element, wherein one of the magnetic flux generating element and the first magnetic-to-electric transducer element is movable relative to the other, the first magnetic-to-electric transducer element being operative for detecting a magnitude of the magnetic flux which is responsive to relative motion between the magnetic flux generating element and the first magnetic-to-electric transducer element and outputting a first detection signal in response to the relative motion between the magnetic flux generating element and the first magnetic-to-electric transducer element, the first magnetic-to-electric transducer element being located proximate to the magnetic flux generating element so as to detect the magnetic flux;

a second magnetic-to-electric transducer element, wherein one of the magnetic flux generating element and the second magnetic-to-electric transducer element is movable relative to the other, the second magnetic-to-electric transducer element being operative for detecting a magnitude of the magnetic flux which is responsive to relative motion between the magnetic flux generating element and the second magnetic-to-electric transducer element and outputting a second detection signal in response to the relative motion between the magnetic flux generating element and the second magnetic-to-electric transducer element, the second magnetic-to-electric transducer element being located proximate to the magnetic flux generating element so as to detect the magnetic flux;

control signal outputting means for comparing the first detection signal output from the first magnetic-to-electric transducer element and the second detection signal output from the second magnetic-to-electric transducer element with each other to detect a difference therebetween, and for outputting a condition normal signal when the detected difference between the first and second detection signals agrees with a predetermined relation, wherein the control signal outputting means further comprises:

a first signal processing circuit for processing the first detection signal output from the first magnetic-to-electric transducer element and outputting a result of said processing;

a second signal processing circuit for processing the second detection signal output from the second magnetic-to-electric transducer element independent of said processing by the second signal processing circuit and outputting a result of said first signal processing; and means for comparing outputs from the first and second signal processing circuits with each other.

20. The electric control apparatus of claim 19, further comprising a single power feed line for feeding a power to the first and the second signal processing circuits, the power feed line being divided into two power supply lines for separately feeding power to the first and the second signal processing circuits, respectively.

21. The electric control apparatus of claim 20, wherein voltages corresponding to the outputs from the first and second signal processing circuits are higher than 0 volt and lower than a predetermined upper limit voltage.

22. An electric control apparatus comprising:

a magnetic flux generating element including opposing portions for generating a given quantity of magnetic flux;

a first magnetic-to-electric transducer element, wherein one of the magnetic flux generating element and the first magnetic-to-electric transducer element is movable relative to the other, the first magnetic-to-electric transducer element being operative for detecting a magnitude of the magnetic flux which is responsive to relative motion between the magnetic flux generating element and the first magnetic-to-electric transducer element and outputting a first detection signal in response to the relative motion between the magnetic flux generating element and the first magnetic-to-electric transducer element, the first magnetic-to-electric transducer element being located proximate to the magnetic flux generating element so as to detect the magnitude of the magnetic flux;

a second magnetic-to-electric transducer element, wherein one of the magnetic flux generating element and the second magnetic-to-electric transducer element is movable relative to the other, the second magnetic-to-electric transducer element being operative for detecting a magnitude of the magnetic flux which is responsive to relative motion between the magnetic flux generating element and the second magnetic-to-electric transducer element and outputting a second detection signal in response to the relative motion between the magnetic flux generating element and the second magnetic-to-electric transducer element, the second magnetic-to-electric transducer element being located at a position such that the magnetic flux magnitude detected by the second magnetic-to-electric transducer element is normally equal to the magnetic flux magnitude detected by the first magnetic-to-electric transducer; and control signal outputting means for mutually processing the first detection signal output from the first magnetic-to-electric and the second detection signal output from second magnetic-to-electric transducer element, and for outputting a control signal in response to a result of said processing, wherein the control signal outputting means also compares the first and second detection signals with each other to detect a difference therebetween and outputs a condition normal signal when the first and second detection signals have a predetermined relation with respect to each other.

23. The electric control apparatus of claim 22, wherein the control signal outputting means further comprises:

reference signal comparing means for comparing the difference between the first and second detection signals detected by the control signal outputting means with a reference signal, the control signal outputting means outputting the condition normal signal when the difference between the first and second detection signal is equal to or less than the reference signal.

24. The electric control apparatus of claim 22, wherein the control signal outputting means further comprises:

reference signal comparing means for comparing the difference between the first and second detection signals detected by the control signal outputting means with a reference signal, the control signal outputting means outputting a malfunction signal when the difference between the first and second detection signals is greater than the reference signal.

25. The electric control apparatus of claim 22, wherein the control signal outputting means also outputs a malfunction signal when the detection signals have a second predetermined relation, the second predetermined relation being different from the first predetermined relation.

26. The electric control apparatus of claim 25, wherein conditions where a relation between the first and second detection signals agree with the predetermined relation correspond to conditions where the difference between the magnitudes of the first and second detection signals is equal to or less than a predetermined value.

27. The electric control apparatus of one of claims 22 or 26, wherein the control signal outputting means comprises a first signal processing circuit for processing the detection signal from the first magnetic-to-electric transducer element and outputting a result of said processing, a second signal processing circuit for processing the detection signal from the second magnetic-to-electric transducer element independent of the first signal processing circuit and outputting a result of said processing, and means for comparing outputs from the first and second signal processing circuits with each other.

28. The electric control apparatus of claim 27, further comprising a single power feed line for feeding a power to the first and the second signal processing circuits, the power feed line being divided into two power supply lines for separately feeding power to the first and the second signal processing circuits, respectively.

29. The electric control apparatus of claim 28, wherein voltages corresponding to the outputs from the first and the second signal processing circuits are higher than 0 volt and lower than a predetermined upper limit voltage.

30. The electric control apparatus of one of claims 22 or 26, further comprising a rotatable body, wherein one of the magnetic flux generating means and the first and second magnetic-to-electric transducer elements is attached to the rotatable body such that the magnitude of the magnetic flux which is detected by the first magnetic-to-electric transducer element varies in proportion to the rotation of the rotatable body, and the magnitude of the magnetic flux, which is detected by the second magnetic-to-electric transducer element, varies in proportion to the rotation of the rotatable body.

31. The electric control apparatus of claim 30, wherein the rotatable body comprises a rod member.

32. The electric control apparatus of claim 31, wherein the magnetic flux generating means is formed in a hollow cylinder concentrically located on with an axis of rotation of the rod member, and is operative to generate the magnetic flux from one side of the cylinder to another side of the cylinder.

33. The electric control apparatus of claim 32, wherein said one side of the cylinder and another side of the cylinder are spaced from each other by gaps.

34. The electric control apparatus of claim 32, wherein the first magnetic-to-electric transducer element and the second magnetic-to-electric transducer element are located within a central portion of the cylinder.

35. The electric control apparatus of claim 34, further comprising a fixing member for fixing an end of the rod member and the magnetic flux generating means to each other.

36. The electric control apparatus of claim 35, wherein the end of the rod member has a groove circumferential with respect to the rotation axis, and the fixing member comprises a retainer made of synthetic resin which is formed in a hollow cylinder having a diameter approximately equal to a diameter of the magnetic flux generating means and which has a wall surface formed with a hole accommodating the magnetic flux generating means, a rotor made therein of magnetic material which is formed in a cylinder having a hollow accommodating the retainer and which has a circumferential groove in an inner surface of the hollow, and a cisclip fitting in both the groove in the rotor and the groove in the rod member and fixing the rotor to the end of the rod member.

37. The electric control apparatus of claim 35, further comprising a second fixing member separate from the fixing member and holding the first mad second magnetic-to-electric transducer elements to position the first and second magnetic-to-electric transducer elements in the magnetic flux generating means.

38. The electric control apparatus of claim 34, further comprising a cover made of magnetic material which isolates the first and the second magnetic-to-electric transducer elements and the magnetic flux generating means from an external magnetic field.

39. The electric control apparatus of claim 31, wherein the rod member comprises a throttle shaft for rotating a throttle valve in an air induction passage.

40. The electric control apparatus of claim 22, wherein each of the first and second magnetic-to-electric transducer elements comprises a Hall element.

41. A throttle valve position sensor apparatus comprising:
a) a movable throttle valve;
b) a throttle position sensor assembly connected to the throttle valve and outputting first and second detection signals in response to a position of the throttle valve, wherein the throttle position sensor assembly comprises:
   i) means for generating a magnetic field;
   ii) a first magnetic sensor exposed to and sensing a portion of the magnetic field and generating the first detection signal representative thereof, wherein one of the magnetic field generating element and the first magnetic sensor is movable relative to the other; and
   iii) a second magnetic sensor exposed to and sensing a portion of the magnetic field and generating the second detection signal representative thereof, wherein one of the magnetic field generating element and the second magnetic sensor is movable relative to the other;
c) means for varying the portions of the magnetic field to which the first and second magnetic sensors are exposed, respectively, in response to a movement of the throttle valve;
d) means for detecting a difference between the first detection signal and the second detection signal output from the throttle position sensor assembly;
e) means for determining whether the difference detected by the detecting means is greater than a predetermined reference value; and
f) means for judging the throttle position sensor assembly to be malfunctioning when the determining means determines the difference to be greater than the predetermined reference value, and for judging the throttle position sensor assembly to be operating normally when the determining means determines the difference to be not greater than the predetermined reference value.

42. The apparatus of claim 41, wherein the magnetic-field generating means comprises a cylindrical magnet having an axial opening and rotating about a central axis thereof in accordance with the movement of the throttle valve, and the first and second magnetic sensors are located at positions which are within the axial opening of the cylindrical magnet and which are symmetrical with respect to the central axis of the cylindrical magnet.

43. An electric control apparatus comprising:
means for generating a magnetic flux;
a movable body;
a first magnetic-to-electric transducer element for detecting a magnitude of the magnetic flux which changes responsive to a motion of the movable body, and for generating a first detection signal representative thereof;
a second magnetic-to-electric transducer element for detecting the magnitude of the magnetic flux which changes responsive to the motion of the movable body, and for generating a second detection signal representative thereof; and
means for comparing the first detection signal generated by the first magnetic-to-electric transducer element and the second detection signal generated by the second magnetic-to-transducer element with each other, and for generating and outputting a control signal in response to a result of the comparing,
wherein the magnetic-flux generating means, the movable body, and the first and second magnetic-to-electric transducer elements compose an arrangement in which the magnitude of the magnetic flux which is detected by the first and second magnetic-to-electric transducer elements varies continuously and gradually without exhibiting a pulse-shaped variation as the movable body moves in one direction.

44. An apparatus comprising:

a rotatable body;

first means for generating a magnetic field;

a first magnetic sensor, exposed to a first portion of the magnetic field generated by the first means, for sensing a first portion of the magnetic field and for generating a first detection signal representative thereof;

a second magnetic sensor, exposed to a second portion of the magnetic field generated by the first means, for sensing a second portion of the magnetic field and for generating a second detection signal representative thereof;

second means for varying the first and second portions of the magnetic field to which the first and second magnetic sensors are exposed, respectively, in response to a rotation of the rotatable body; and third means for comparing the first and second detection signals with each other, and for generating a comparison signal representative of a result of the comparing, wherein the first magnetic sensor is located at a first angle with respect to a direction of the first portion of the magnetic field and the second magnetic sensor is located at a second angle with respect to a direction of the second portion of the magnetic field, and wherein the first angle and the second angle remain substantially equal to each other and vary in accordance with the rotation of the rotatable body.

* * * * *